United States Patent
Lemmons et al.

(10) Patent No.: US 11,615,445 B2
(45) Date of Patent: Mar. 28, 2023

(54) SYSTEMS, METHODS, COMPUTING PLATFORMS, AND STORAGE MEDIA FOR PROVIDING IMAGE RECOMMENDATIONS

(71) Applicant: Shutterstock, Inc., New York, NY (US)

(72) Inventors: Mark Lemmons, Arvada, CO (US); Frank Cardello, Littleton, CO (US)

(73) Assignee: SHUTTERSTOCK, INC., New York, NY (US)

( * ) Notice: Subject to any disclaimer, the term of this patent is extended or adjusted under 35 U.S.C. 154(b) by 0 days.

(21) Appl. No.: 17/515,899

(22) Filed: Nov. 1, 2021

(65) Prior Publication Data
US 2022/0138805 A1 May 5, 2022

Related U.S. Application Data

(60) Provisional application No. 63/108,808, filed on Nov. 2, 2020.

(51) Int. Cl.
| | |
|---|---|
| *G06Q 30/02* | (2012.01) |
| *G06Q 30/0241* | (2023.01) |
| *G06F 16/535* | (2019.01) |
| *G06Q 30/0204* | (2023.01) |

(52) U.S. Cl.
CPC ....... *G06Q 30/0276* (2013.01); *G06F 16/535* (2019.01); *G06Q 30/0205* (2013.01)

(58) Field of Classification Search
CPC .............. G06Q 30/0276; G06Q 30/0205
See application file for complete search history.

(56) References Cited

U.S. PATENT DOCUMENTS

| | | | |
|---|---|---|---|
| 7,996,753 B1 * | 8/2011 | Chan ................ | G06Q 30/0263 715/234 |
| 2005/0251399 A1 * | 11/2005 | Agarwal ............ | G06F 16/958 705/26.1 |
| 2011/0072047 A1 | 3/2011 | Wang et al. | |

(Continued)

OTHER PUBLICATIONS

"Learning Crowdsources User Preferences for Visual Summarization of Image Collections" (Rudinac, Stevan et al. IEE transactions on Multimedia, vol. 15, No. 6, Oct. 2013) (Year: 2013).*

(Continued)

*Primary Examiner* — James M Detweiler
(74) *Attorney, Agent, or Firm* — McDermott Will & Emery LLP

(57) ABSTRACT

Systems, methods, computing platforms, and storage media for providing image recommendations are disclosed. Exemplary implementations may: receive a set of images; access a context segment graph comprising one or more nodes; identify a subset of images related to a node in the context segment graph; receive one or more user responses for the subset of images; generate one or more models based on the user responses; receive one or more candidate images for a creative campaign; determine, using at least one model, a relatedness value and a responsiveness value for at least a portion of the one or more candidate images; and display a listing of the plurality of candidate images, wherein the listing includes, for each candidate image, a confidence score and one or more of the relatedness and responsiveness values in context to the node.

16 Claims, 20 Drawing Sheets

(56) References Cited

U.S. PATENT DOCUMENTS

| | | | |
|---|---|---|---|
| 2013/0246195 A1* | 9/2013 | Berry | G06T 3/40 |
| | | | 705/14.72 |
| 2014/0156379 A1 | 6/2014 | Pani et al. | |
| 2014/0372951 A1 | 12/2014 | Li et al. | |
| 2017/0046733 A1* | 2/2017 | Schler | G06Q 30/0244 |
| 2018/0053208 A1 | 2/2018 | Upstone et al. | |
| 2018/0189597 A1* | 7/2018 | Johri | G06V 10/945 |

OTHER PUBLICATIONS

TheTradeDesk—Koa artificial intelligence—website retrieved on Jan. 31, 2022 from https://www.thetradedesk.com/us/our-platform/dsp-demand-side-platform/koa-ai-arlificial-intelligence, 4 pgs.
US/RO: International Search Report and Written Opinion for related International Application No. PCT/US2021/057558, dated Apr. 28, 2022, 13 pgs.

* cited by examiner

SYSTEMS, METHODS, COMPUTING PLATFORMS, AND STORAGE MEDIA FOR PROVIDING IMAGE RECOMMENDATIONS

CLAIM OF PRIORITY UNDER 35 U.S.C. § 119

The present Application for Patent claims priority to U.S. Provisional Application No. 63/108,808 filed Nov. 2, 2020, and assigned to the assignee hereof, which is hereby expressly incorporated by reference herein.

FIELD OF THE DISCLOSURE

The present disclosure relates to systems, methods, computing platforms, and storage media for providing image recommendations.

BACKGROUND

Digital advertisers use creative content, such as photos and videos to target their audiences. On today's digital platforms, studies have shown that users or audiences give creative less than a quarter-second of attention. In the blink of an eye, users are making the choice to either engage or abandon an advertisement. Such a short duration puts a lot of pressure on advertisers and marketing professionals on appropriate image selection, placement, etc., for advertisements placed on digital platforms.

Current techniques for image selection and placement in digital advertisements are lacking due to the large number of potential images available for placement, only a few of which may equate to enhancing the value of the creative due to higher resonance with the audience versus the alternatives.

The description provided in the background section should not be assumed to be prior art merely because it is mentioned in or associated with the background section. The background section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Aspects of the current disclosure generally relate to predicting image performance for a creative by assigning human subjective labels to images using an artificial intelligence (AI) algorithm. For the purposes of this disclosure, the terms "segment" or "audience segment" may refer to an audience cohort (i.e., a group of people identified together as a group). For instance, an example of an audience segment is "people who enjoy running", or "people who like a certain genre of music (e.g., heavy metal)", or "young people who like traveling". In some cases, a segment may refer to an audience targeting vector, and may be associated with advertising bid factors, interests or affinities, location, demographics, etc., to name a few examples. Further, for the purposes of this disclosure, the term "model" may be used to refer to a scoring model, such as a general audience model, a social media platform/website model, or an interests model (e.g., health and fitness, art, music, fashion, food, etc.). In some other cases, the term "model" may refer to a context detection model (e.g., for location or social context), an aesthetic and/or technical classifier model, or a natural language processing (NLP)-based segment detector model.

In some aspects, the present disclosure also relates to predicting performance of a creative, such as an advertisement, when a certain image or set of images is utilized for the creative. Studies have shown that humans tend to relate more positively to images that are familiar to them, invoke a sense of happiness (e.g., positive memories), are visually appealing to them, or are awe-inspiring to them. However, different people find different images appealing, and an image used in an ad might elicit a follow up from one audience member but not another. Further, the context in which an image is used in a creative might also play a role in a user or audience member following or abandoning the creative.

In some embodiments, the system described in this disclosure may comprise predictive image intelligence capability based on artificial intelligence (e.g., machine learning (ML)). The system may utilize classifiers and human survey data for subjective classification of images which may enhance image selection. In some cases, the system may identify different audience segments or cohorts within an audience (e.g., a set of users). The system may collect user responses from the audience, or alternatively, from an audience segment, where the user responses include a relatedness value and a responsiveness value for images given a context. For instance, the system may display, to a user (e.g., general user, fitness enthusiast, running enthusiast), an image of a person running and ask the user if that image would be suitable to use in a creative or ad for a running brand given a context "shoes". In some cases, the user response may include at least a relatedness value (e.g., binary value, such as yes/no, true/false) to indicate if the image is related to the context. Additionally, the user response may also include a responsiveness value (e.g., between 0 and 5, between 1 and 10, etc.) to indicate the user perception (e.g., higher number indicates more positive and lower number indicates more negative) of that image given the context. The system may gather human subjective responses for images in relation to a given context and feed the collected data into a classifier or machine-learning algorithm. The classifier or machine-learning algorithm may be trained using the collected data (also referred to as the training dataset) to assign subjective classification labels (e.g., relatedness, responsiveness) to other images given a particular context. In some examples, the classifier or machine-learning algorithm may identify one or more attributes of the images in the training dataset, where the attributes may include pixel related information, stylistic information, and/or an image vector. While not necessary, in some examples, the attributes may also include keyword metadata or tags. In some cases, the keyword metadata or tags may be human generated. Alternatively, the keyword metadata or tags may be machine-generated using computer vision techniques. In some embodiments, the system may classify images from a wide variety of sources (e.g., social media platforms, websites, image group boards or forums, stock image sites, etc.) based on their predicted performance with the different audience or focus groups. In some cases, the predicted performance may be based in part on a context.

For instance, a photo of a person running may elicit a positive response from a user placed in a "Running" audience segment, when the given context is "shoes". However, a business minded professional may be indifferent (e.g., abandon the ad) when shown the same image and given the same context (i.e., shoes). To the business minded professional user, an image of a man wearing a suit and Oxford shoes may elicit a positive response (e.g., follow through with the ad), given the "shoes" context. It should be noted that these are merely examples, and not intended to be limiting.

One aspect of the present disclosure relates to a system configured for providing image recommendations. The system may include one or more hardware processors configured by machine-readable instructions. The processor(s) may be configured to receive a set of images from one or more image sources. The processor(s) may be configured to access a context segment graph including one or more nodes. Each node may be associated with at least one segment. The at least one segment may be selected from a group consisting of an interest, a business segment, or an audience segment. The processor(s) may be configured to identify, from the set of images, a subset of images related to a node in the context segment graph. The processor(s) may be configured to receive, from at least one user, user responses for the subset of images, wherein each user response includes a relatedness value and a responsiveness value for an image from the subset of images in context to the node. The processor(s) may be configured to generate one or more models for predicting image performance based in part on the user responses. The processor(s) may be configured to receive a plurality of candidate images for a creative campaign. The processor(s) may be configured to determine, using at least one model of the one or more models, a first set of metrics for each candidate image of the plurality of candidate images in context to the node. The processor(s) may be configured to display a listing of the plurality of candidate images, wherein the listing comprises the first set of metrics for each of the plurality of candidate images, and wherein the first set of metrics for each candidate image includes at least a confidence score and one or more of a relatedness value and a responsiveness value in context to the node.

Another aspect of the present disclosure relates to a method for providing image recommendations. The method may include receiving a set of images from one or more image sources. The method may include accessing a context segment graph comprising one or more nodes, each node associated with at least one segment, wherein the at least one segment is selected from a group consisting of an interest, a business segment, or an audience segment. The method may include identifying, from the set of images, a subset of images related to a node in the context segment graph. The method may include receiving, from at least one user, user responses for the subset of images, wherein each user response includes a relatedness value and a responsiveness value for an image from the subset of images in context to the node. The method may include generating one or more models for predicting image performance based in part on the user responses. The method may include receiving a plurality of candidate images for a creative campaign. The method may include determining, using at least one model of the one or more models, a first set of metrics for each candidate image of the plurality of candidate images in context to the node. The method may include displaying a listing of the plurality of candidate images, wherein the listing comprises the first set of metrics for each of the plurality of candidate images, and wherein the first set of metrics for each candidate image includes at least a confidence score and one or more of a relatedness value and a responsiveness value in context to the node.

Even another aspect of the present disclosure relates to a non-transient computer-readable storage medium having instructions embodied thereon, the instructions being executable by one or more processors to perform a method for providing image recommendations. The method may include receiving a set of images from one or more image sources. The method may include accessing a context segment graph comprising one or more nodes, each node associated with at least one segment, wherein the at least one segment is selected from a group consisting of an interest, a business segment, or an audience segment. The method may include identifying, from the set of images, a subset of images related to a node in the context segment graph. The method may include receiving, from at least one user, user responses for the subset of images, wherein each user response includes a relatedness value and a responsiveness value for an image from the subset of images in context to the node. The method may include generating one or more models for predicting image performance based in part on the user responses. The method may include receiving a plurality of candidate images for a creative campaign. The method may include determining, using at least one model of the one or more models, a first set of metrics for each candidate image of the plurality of candidate images in context to the node. The method may include displaying a listing of the plurality of candidate images, wherein the listing comprises the first set of metrics for each of the plurality of candidate images, and wherein the first set of metrics for each candidate image includes at least a confidence score and one or more of a relatedness value and a responsiveness value in context to the node.

In some examples of the method, system, and non-transitory computer-readable medium described above, each user response is defined using a first scoring portion and a second scoring portion, the second scoring portion conditional on the first scoring portion.

In some examples of the method, system, and non-transitory computer-readable medium described above, receiving the user responses comprises receiving a first scoring portion for each user response, each first scoring portion comprising a binary sample of user expectation of relatedness of a respective image of the subset of images in context to the node in the context segment graph, the binary sample selected from one of yes or no, 1 or 0, or true or false.

Some examples of the method, system, and non-transitory computer-readable medium described above may further include processes, features, means, or instructions for identifying, for at least one image of the subset of images, a respective first scoring portion for at least one user response comprises one of, yes, 1, or true. Some examples of the method, system, and non-transitory computer-readable medium described above may further include processes, features, means, or instructions for receiving a second scoring portion for each user response of the at least one user response, each second scoring portion comprising a numerical value for a respective image of the subset of images, wherein each numerical value is rated on a scale between a lower bound and an upper bound, and wherein each numerical value is associated with a responsiveness to the node.

In some examples of the method, system, and non-transitory computer-readable medium described above, the first scoring portion comprises the relatedness value and the second scoring portion comprises the responsiveness value.

Some examples of the method, system, and non-transitory computer-readable medium described above may further include processes, features, means, or instructions for aggregating user response data based on receiving the user responses for the subset of images in context to the node in the context segment graph. Some examples of the method, system, and non-transitory computer-readable medium described above may further include processes, features, means, or instructions for generating a training dataset comprising at least the subset of images, information pertaining to the node in the context segment graph, and the aggregated user response data.

In some examples of the method, system, and non-transitory computer-readable medium described above generating the one or more models for predicting image performance comprises training a machine learning algorithm to label a relatedness value and a responsiveness value for the plurality of candidate images in context to the node in the context segment graph, wherein the machine learning algorithm is trained using the generated training dataset.

Some examples of the method, system, and non-transitory computer-readable medium described above may further include processes, features, means, or instructions for defining, for at least one node in the context segment graph, including the node, a tag cloud or term group.

In some examples of the method, system, and non-transitory computer-readable medium described above a context segment graph is associated with one or more segment categories, the one or more segment categories selected from a group consisting of fashion, fitness, food, business, creative, real estate, beauty, medical, consumer goods, travel, outdoors, and home services.

Some examples of the method, system, and non-transitory computer-readable medium described above may further include processes, features, means, or instructions for receiving advertisement performance data for a plurality of advertisements, wherein each advertisement of the plurality of advertisements displays an image from the subset of images. Some examples of the method, system, and non-transitory computer-readable medium described above may further include processes, features, means, or instructions for determining, for each image displayed in an advertisement, an aggregate score, wherein the aggregate score is based at least in part on the relatedness values and responsiveness values for the image received via the user responses. Some examples of the method, system, and non-transitory computer-readable medium described above may further include processes, features, means, or instructions for comparing, for each image displayed in an advertisement, a respective aggregate score and respective advertisement performance data. Some examples of the method, system, and non-transitory computer-readable medium described above may further include processes, features, means, or instructions for validating the one or more models for predicting image performance based in part on comparing the respective aggregate scores and advertisement performance data.

In some examples of the method, system, and non-transitory computer-readable medium described above the one or more models comprise one or more of a general audience model, a social media model, a stock images model, an interests model, an audience segment or audience cohort model, a context model, and a segment model.

In some examples of the method, system, and non-transitory computer-readable medium described above generating the one or more models for predicting image performance comprises identifying one or more attributes for each image from the subset of images, wherein the one or more attributes include one or more of pixel related information, stylistic information, an image vector, keyword metadata or tags, and human labels; grouping the subset of images into a number of groups based on the relatedness and responsiveness values from the user responses; and determining an average of attributes for each group based at least in part on the one or more attributes for each image in the group.

In some examples of the method, system, and non-transitory computer-readable medium described above determining the first set of metrics for each of the one or more candidate images comprises determining one or more attributes for each candidate image; determining a similarity vector (also referred to as similarity measure or similarity function) for each candidate image by comparing the one or more attributes for each candidate image with respect to the average of attributes for each group; and assigning a plurality of labels to each candidate image based at least in part on the determined similarity vector, wherein the plurality of labels include a confidence score, a relatedness value, and a responsiveness value for a candidate image in context to the node.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
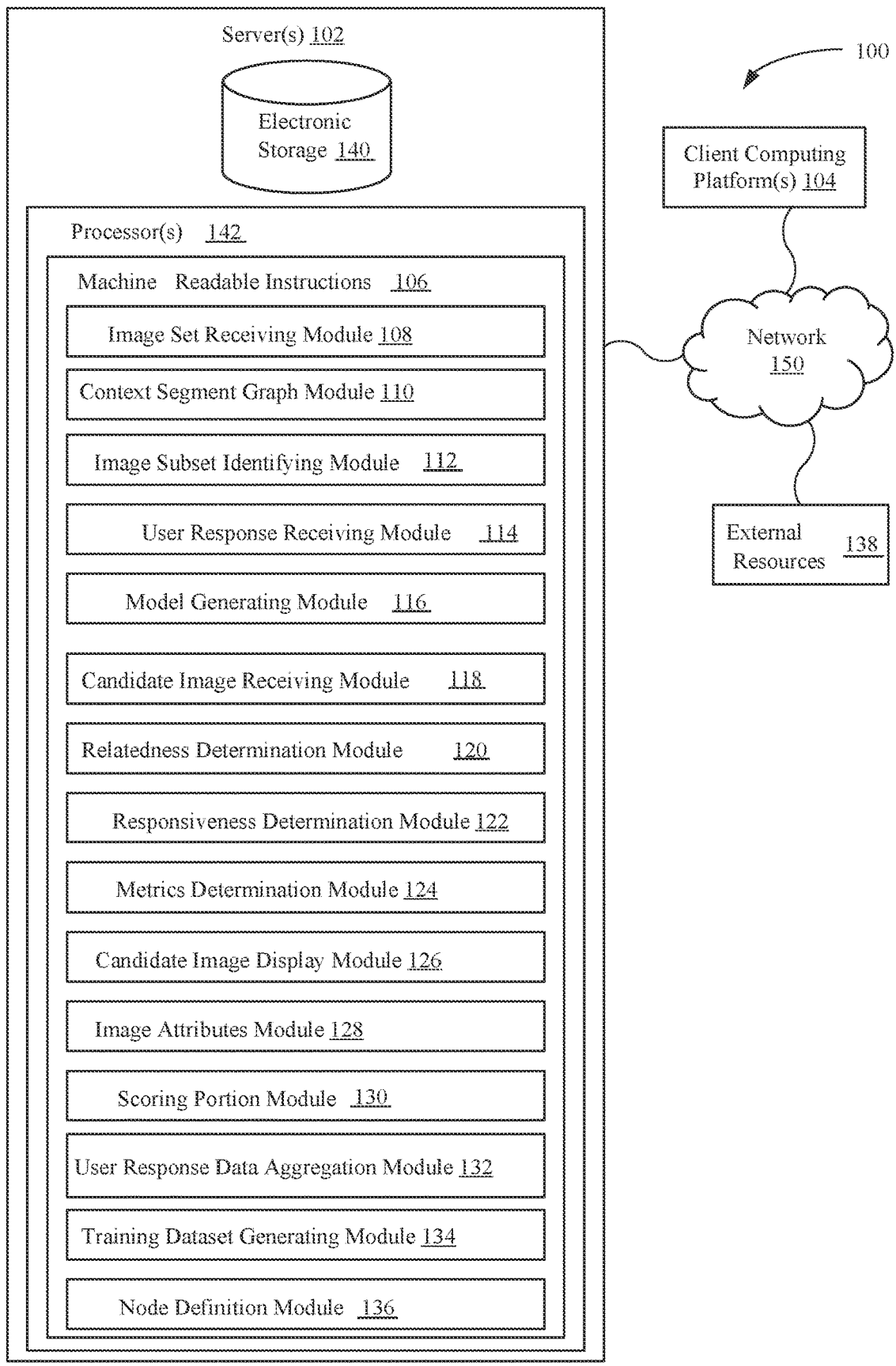
FIG. 1 illustrates a system configured for providing image recommendations, in accordance with one or more implementations.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device" is not meant to be limiting to a single such device. It is contemplated that numerous devices may comprise a single "device" as described herein.

As detailed herein, the disclosure generally relates to a system and a method for predicting image performance for a creative, such as an ad campaign, based on artificial intelligence (AI) (e.g., machine learning (ML)) labeling of imagery. In some embodiments, the system described in this disclosure may comprise predictive image intelligence capability based on AI. In some cases, the system (e.g., systems 100, 1400, and/or 1500) may identify different audience segments or cohorts within a larger audience (e.g., a set of users). Further, the system may classify images from a wide variety of sources (e.g., social media, websites, image group boards or forums, stock image sites, etc.) based on their predicted performance with the different audience segments. In some cases, the predicted performance may be based in part on a context. As described above, the system may utilize classifiers and human survey data (e.g., user responses for images given a context) to generate subjective classification labels for future candidate images. It should be noted that, the future candidate images may not be included in the training dataset of images used to encode the classifier. The classifier may be an example of an AI or ML algorithm. Some non-limiting examples of subjective classification labels may include a relatedness value and a responsiveness value. The training dataset fed into the classifier may include a set of images and user responses for the images given a context, where the user responses may include relatedness and responsiveness values for images given the context. In this way, the classifier may be used to predict relatedness and responsiveness values for future candidate images given a context.

In some embodiments, after collecting and picking images from a plurality of image sources, the system may be configured to generate and run models, for instance an ad score model. In some cases, the model may comprise a supervised machine learning model utilizing classifiers (e.g., a convolutional neural network (CNN)). In some cases, such a model may also be referred to as a segment-based CNN. Different types of ad score models may be utilized based on the target audience, audience group, focus group, etc. For instance, a social media ad score model may refer to a ML model for predicting if an average social media user might find an image or subset of images appealing given a context. In another example, a health and fitness audience model may be used to predict an image or subset of images that users from a health and fitness audience segment might find more appealing. It should be noted that, the predictions described throughout this disclosure may be based in part on a given context. In other words, given an image or set of images and a context, what would a person (e.g., general audience, social media user, particular interests user, etc.) think of said image (or set of images).

Aspects of the present disclosure may be akin to giving the audience or users "a seat at the creative process table." For instance, audience members may be provided a context and asked for feedback on an image (or set of images). Further, their feedback may be incorporated into the ML model to gain some scale out of the model. In other words, feedback received from a large number of audience members may serve to ensure that the images used in creatives are an adequate representation of them, appealing to them, more likely to elicit engagement from them, etc. Thus, instead of relying on an ad designer or a digital brand manager or a marketing manager for their opinion on how well an image would be for an ad campaign, the ML model utilizes qualitative insight from the actual audience, at scale. In some cases, human labels, such as relatedness and responsiveness values, may be acquired for images associated with a particular segment. In one example, at least 5000 images and 30,000 labels from humans may be utilized to generate a model, although different number of images and labels are contemplated in other embodiments. In some cases, a higher number of images and/or labels may correlate to a more accurate model.

In some embodiments, the system may access a context segment graph (e.g., shown as context segment graph 1600 in FIG. 16) comprising one or more nodes, where each node is associated with at least one segment, such as an interest, a business segment, and/or an audience segment, to name a few non-limiting examples. In some aspects, the context segment graph may comprise a taxonomy of interests, business segments or audience cohorts, such as fitness, fashion, food, art, music, etc. It should be noted that the examples listed above are non-limiting, and different interests, business segments or audience cohorts may be contemplated in different embodiments. Further, the segments may be narrower (e.g., Italian food, or Crossfit fitness) or broader than those listed above. In some embodiments, the context segment graph may be accessed from an ad targeting system, although in other cases the context segment graph may be generated by the system (e.g., system 100 in FIG. 1) itself. In some cases, a group of descriptive terms (e.g., tag cloud) may be defined for each node in the context segment graph. A group of descriptive terms might include "small business", "entrepreneur", "marketplace", "market", "growth", and/or product names. In some examples, a subset of imagery from the set of images (e.g., of size N) may be identified, where the subset of imagery may be related to a particular node in the context segment graph, further described in relation to the figures below. In some cases, an image may be associated with one or more nodes in the context segment graph. Additionally, or alternatively, an image from the original set of 'N' images may not be associated with any node in the context segment graph once the subsets of images are identified.

In some embodiments, an image subset related to a node in the context segment graph may be selected. Further, human survey data for the images in the subset in context to (or given) that node may be aggregated, further described below. In some cases, the human survey data may be collected from direct or indirect audience feedback. For example, users might be provided a context cue, for instance, "Would this be a good image for a running ad (yes/no)", and if so, "How likely would you be to engage with an ad including this image if you were a runner? (1-5)". In some embodiments, multiple users may be queried, and their answers averaged. Further, the image subset and the aggregated answers may be used to generate the training dataset. In this way, one or more models may be trained with hundreds, thousands, or even millions of images, each with a plurality of answers to these questions from actual people.

In some cases, each response may be defined in two scoring portions or parts, where a second scoring portion may be conditional on the first scoring portion. For instance, the first scoring portion may comprise a binary sample of human expectation of relatedness (e.g., a 'yes' or 'no', a '1' or '0', 'true' or 'false', 'related' or 'unrelated', to name a few non-limiting examples) of images from the image subset in context to the node. In some cases, the responses may be collected from random audience members. In other cases, the responses may be collected from audience members associated with a particular segment or audience cohort (e.g., having a particular interest, such as fitness or running). Next, for the second scoring portion, only images deemed to be related to the node may be graded on a scale (e.g., between 0% and 100%, between 1 and 10, between 0 and 5, etc.). In some cases, the second scoring portion or part may relate to a responsiveness (response likelihood), where the responsiveness is rated on said scale. It should be noted that, the number of scoring portions is not intended to be limiting. In some cases, a user response may comprise more than two scoring portions, or alternatively, a single scoring portion.

FIG. 1 illustrates a system 100 configured for providing image recommendations, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of image set receiving module 108, context segment graph module 110, image subset identifying module 112, user response receiving module 114, model generating module 116, candidate image receiving module 118, relatedness determination module 120, responsiveness determination module 122, metrics determination module 124, candidate image display module 126, image attributes module 128, scoring portion module 130, user response data aggregation module 132, training dataset generating module 134, node definition module 136, and/or other instruction modules.

Image set receiving module 108 may be configured to receive a set of images from one or more sources. In some embodiments, the set of images may be received from one or more image servers (e.g., image server 317 in FIG. 3). Remote computing platform 104 may be one non-limiting example of an image server.

Context segment graph module 110 may be configured to access a context segment graph (e.g., shown as context segment graph 1600 in FIG. 16) including one or more nodes. Each node may be associated with at least one segment. By way of non-limiting example, the at least one segment may be selected from a group consisting of an interest, a business segment, or an audience segment. Although not necessary, in some cases, the context segment graph may be accessed from an ad targeting server. Additionally, or alternatively, the context segment graph may be associated with one or more segment categories, including, but not limited to, fashion, fitness, food, business, creative, real estate, beauty, medical, consumer goods, travel, outdoors, home services, etc. Other segment categories known in the art are contemplated in different embodiments and the examples listed herein are not intended to be limiting.

Image subset identifying module 112 may be configured to identify, from the set of images, a subset of images related to a node in the context segment graph.

User response receiving module 114 may be configured to receive user responses for the subset of images. The user responses may be received from at least one user and may be in context to the node in the context segment graph. In some examples, each user response may include a relatedness value and a responsiveness value for an image from the subset of images in context to the node, further described in relation to the figures below. In some cases, the user responses may be received from at least one user device (e.g., remote computing platform 104) associated with the at least one user. The user response receiving module 114, or another module of system 100, may be configured to group the subset of images into a number of groups based on the relatedness and responsiveness values from the user responses. For instance, a first cluster or group of images from the subset of images may include images that had similar relatedness and responsiveness values (e.g., Yes for relatedness and 5/5 for responsiveness) in the user responses, a second cluster or group of images may include images that had similar relatedness and responsiveness values (e.g., Yes for relatedness and 3/5 for responsiveness) in the user responses, a third cluster or group of images may include images that had similar relatedness values (e.g., No for relatedness) in the user responses, and so on. In some cases, images in the same cluster or group may also share one or more stylistic attributes and compositional attributes, to name two non-limiting examples. For instance, when the context is "Skiing", images that are highly rated by users for responsiveness and relatedness may share certain compositional attributes, such as, snow, a person on skis, a snow-covered mountain, etc. In some cases, the system of the present disclosure may map the compositional and stylistic attributes, amongst other information, of the images from a group to the relatedness and responsiveness values for that group to generate the ML models. In this way, a future candidate image may be assigned relatedness and/or responsiveness values based on the attributes (e.g., stylistic information, pixel related information, compositional attributes, etc.) of that image. For instance, a future candidate image of a person snowboarding may be labeled as 'Yes' for relatedness and a '4/5' or even '5/5' for responsiveness since the image includes a mountain or snow.

Model generating module 116 may be configured to generate one or more models for predicting image performance based in part on the user responses. Generating the one or more models for predicting ad performance may include training a machine learning algorithm, or another artificial intelligence algorithm, to label a relatedness value and a responsiveness value for at least one candidate image in context to the node in the context segment graph. By way of non-limiting example, the one or more models may include one or more of a general audience model, a social media model, a stock images model, an interests model, an audience segment or audience cohort model, a context model, and a segment model.

Candidate image receiving module 118 may be configured to receive a plurality of candidate images for a creative campaign. One non-limiting example of a creative campaign may include an advertisement (ad) campaign.

Relatedness determination module 120 may be configured to determine, using at least one model of the one or more models, a relatedness value for each candidate image.

Responsiveness determination module 122 may be configured to determine, using at least one model of the one or more models, a responsiveness value for at least a portion of the candidate images. In some embodiments, the responsiveness determination module 122 may only determine a responsiveness value for a candidate image when the relatedness value for the candidate image meets a certain criterion. For instance, a responsiveness value for a candidate image may only be determined when the relatedness determination module 120 determines that the candidate image is related to the node. In other words, the responsiveness determination module 122 determines responsiveness value(s) for candidate image(s) that are assigned a relatedness value of '1' or 'True' or 'Related'.

Metrics determination module 124 may be configured to determine, using at least one model of the one or more models, a first set of metrics for each candidate image of the plurality of candidate images in context to the node. In some cases, the first set of metrics for each candidate image includes at least a confidence score and one or more of a relatedness value and a responsiveness value in context to the node.

Candidate image display module 126 may be configured to display a listing of the plurality of candidate images. In some examples, the listing comprises the first set of metrics for each of the plurality of candidate images, further described in relation to FIGS. 5-11.

Image attributes module 128 may be configured to identify one or more attributes for each image from the subset of images. In some cases, the one or more attributes include one or more of pixel related information, stylistic information, an image vector, keyword metadata or tags, and human labels. Image attributes module 128 may also be configured to determine an aggregate, or alternatively, an average, of attributes for each group based at least in part on the one or more attributes for each image in the group.

In some cases, the image attributes module 128 may also be configured to determine one or more attributes for each candidate image. Additionally, the image attributes module 128, or another module of system 100, may be configured to determine a similarity vector (or similarity measure) for each candidate image by comparing the one or more attributes for each candidate image with respect to the aggregate, or alternatively, the average, of attributes for each group. The image attributes module 128 may be configured to work in conjunction with one or more of the relatedness determination module 120, responsiveness determination 122, and/or metrics determination module 124 to assign a plurality of labels to each candidate image. In some cases, the plurality of labels assigned to each candidate image may be based in part on the determined similarity vector or measure. Further, the plurality of labels may include a confidence score, a relatedness value, and a responsiveness value for a candidate image in context to the node. Other types of labels may be assigned in different embodiments, and the examples listed herein are not intended to be limiting.

In some cases, each user response may be defined using a first scoring portion and a second scoring portion, where the second scoring portion is conditional on the first scoring portion. In some embodiments, receiving the user responses comprises receiving a first scoring portion for each user response, each first scoring portion comprising a binary sample of user expectation of relatedness of a respective image of the subset of images in context to the node in the context segment graph, the binary sample selected from one of 'yes' or 'no', '1' or '0', 'related' or 'unrelated', or 'true' or 'false'.

Scoring portion module 130 may be configured to identify, for at least one image of the subset of images, a respective first scoring portion includes one of: 'yes' or 'no', '1' or '0', 'related' or 'unrelated', or 'true' or 'false'. In some cases, the first scoring portion comprises a binary response to a relatedness of an image to the selected node in the context segment graph. Further, the scoring portion module 130 (or alternatively, the user response receiving module 114) may be configured to receive a second scoring portion for each user response of the at least one user response. By way of non-limiting example, each second scoring portion may comprise a numerical value for a respective image of the subset of images, wherein each numerical value is rated on a scale between a lower bound and an upper bound, and wherein each numerical value is associated with a responsiveness to the node. In some examples, the first scoring portion comprises the relatedness value and the second scoring portion comprises the responsiveness value.

User response data aggregation module 132 may be configured to aggregate user response data based on receiving the user responses for the subset of images in context to the node in the context segment graph. Aggregating user response data may include determining a mean (or average) for relatedness and responsiveness for each image from the subset of images. In some cases, aggregating the relatedness values for an image may include determining whether the image was indicated as being 'related' or 'unrelated' by at least half the users. Further, aggregating the responsiveness values for an image may comprise computing a numerical average of the relatedness values from the user responses.

Training dataset generating module 134 may be configured to generate a training dataset comprising at least the subset of images, information pertaining to the node in the context segment graph, and the aggregated user response data. As noted above, generating the one or more models for predicting image performance comprises training a machine learning algorithm to label a relatedness value and a responsiveness value for the plurality of candidate images in context to the node in the context segment graph. In some cases, the machine learning or AI algorithm may be trained using the generated training dataset.

Node definition module 136 may be configured to define, for at least one node in the context segment graph, including the node, a tag cloud or term group.

In some implementations, server(s) 102, client computing platform(s) 104, and/or external resources 138 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, and/or other resources. In some implementations, some or all of the functionality attributed herein to external resources 138 may be provided by resources included in system 100.

Server(s) 102 may include electronic storage 140, one or more processors 142, and/or other components. Server(s) 102 may include communication lines, or ports to enable the exchange of information with the network 150 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 140 may comprise non-transitory storage media that electronically stores information. The electronic storage media of electronic storage 140 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Electronic storage 140 may store software algorithms, information determined by processor(s) 142, information received from server(s) 102, information received from client computing platform(s) 104, and/or other information that enables server(s) 102 to function as described herein.

Processor(s) 142 may be configured to provide information processing capabilities in server(s) 102. As such, processor(s) 142 may include one or more of a digital processor, an analog processor, a digital circuit designed to process information, an analog circuit designed to process information, a state machine, and/or other mechanisms for electronically processing information. Although processor(s) 142 is shown in FIG. 1 as a single entity, this is for illustrative purposes only. In some implementations, processor(s) 142 may include a plurality of processing units. These processing units may be physically located within the same device, or processor(s) 142 may represent processing functionality of a plurality of devices operating in coordination. Processor(s) 142 may be configured to execute modules 108, 110, 112, 114, 116, 118, 120, 122, 124, 126, 128, 130, 132, 134, and/or 136, and/or other modules. Processor(s) 142 may be configured to execute modules 108, 110, 112, 114, 116, 118, 120, 122, 124, 126, 128, 130, 132, 134, and/or 136, and/or other modules by software; hardware; firmware; some combination of software, hardware, and/or firmware; and/or other mechanisms for configuring processing capabilities on processor(s) 142. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, 132, 134, and/or 136 are illustrated in FIG. 1 as being implemented within a single processing unit, in implementations in which processor(s) 142 includes multiple processing units, one or more of modules 108, 110, 112, 114, 116, 118, 120, 122, 124, 126, 128, 130, 132, 134, and/or 136 may be implemented remotely from the other modules. The description of the functionality provided by the different modules 108, 110, 112, 114, 116, 118, 120, 122, 124, 126, 128, 130, 132, 134, and/or 136 described below is for illustrative purposes, and is not intended to be limiting, as any of modules 108, 110, 112, 114, 116, 118, 120, 122, 124, 126, 128, 130, 132, 134, and/or 136 may provide more or less functionality than is described. For example, one or more of modules 108, 110, 112, 114, 116, 118, 120, 122, 124, 126, 128, 130, 132, 134, and/or 136 may be eliminated, and some or all of its functionality may be provided by other ones of modules 108, 110, 112, 114, 116, 118, 120, 122, 124, 126, 128, 130, 132, 134, and/or 136. As another example, processor(s) 142 may be configured to execute one or more additional modules that may perform some or all of the functionality attributed below to one of modules 108, 110, 112, 114, 116, 118, 120, 122, 124, 126, 128, 130, 132, 134, and/or 136.

FIGS. 2A, 2B, 2C, 2D, and 2E illustrate methods 200-*a*, 200-*b*, 200-*c*, 200-*d*, and 200-*e*, respectively, for providing image recommendations, in accordance with one or more implementations. The operations of methods 200 presented below are intended to be illustrative.

In some implementations, methods 200 may be accomplished with one or more additional operations not described, and/or without one or more of the operations discussed. Additionally, the order in which the operations of methods 200 are illustrated in FIGS. 2A, 2B, 2C, 2D, and/or 2E and described below are not intended to be limiting.

In some implementations, methods 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200 in response to instructions stored electronically on an electronic storage medium. The one or more processing devices may include one or more devices configured through hardware, firmware, and/or software to be specifically designed for execution of one or more of the operations of methods 200.

Figure 2A:
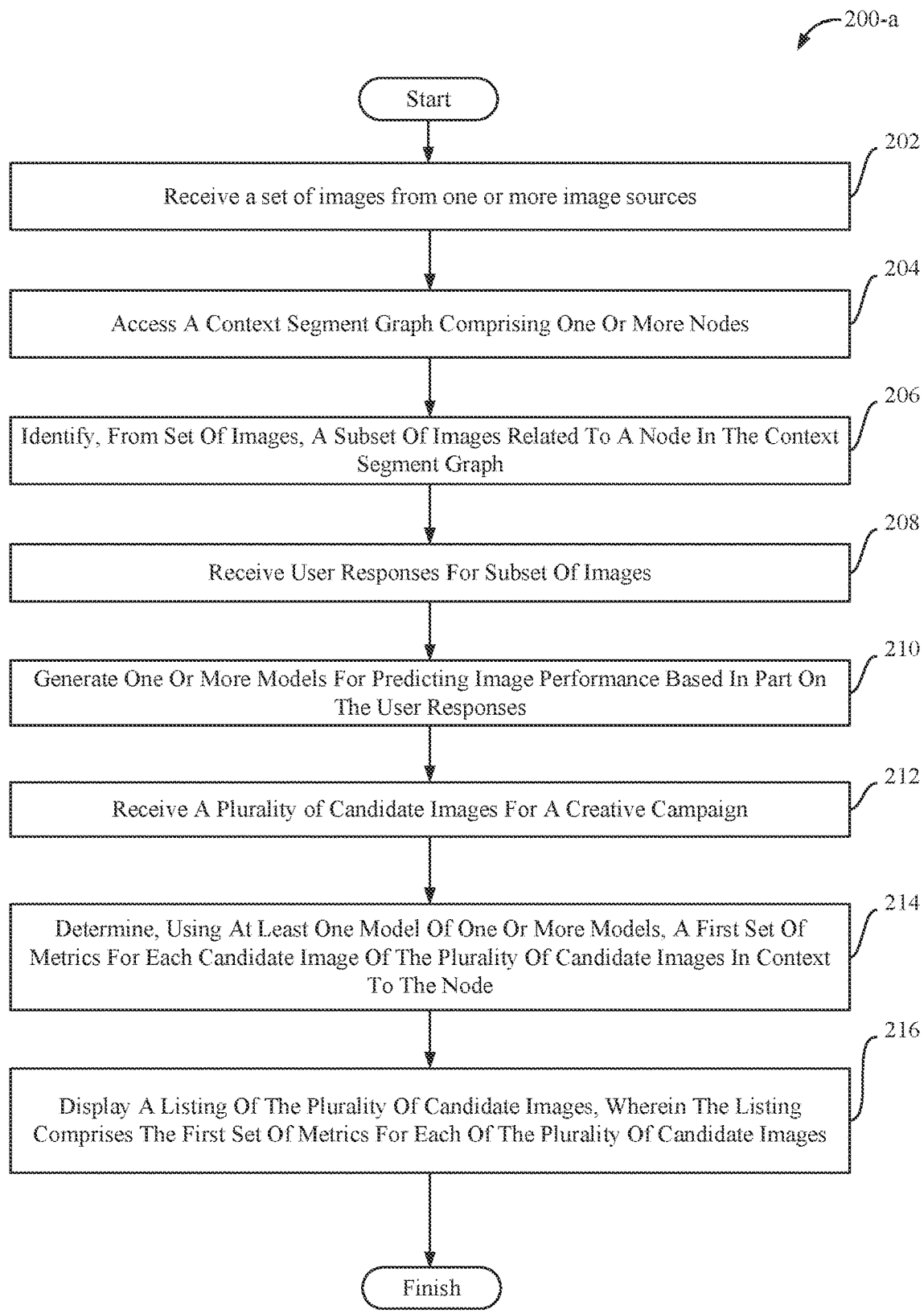
FIGS. 2A, 2B, 2C, 2D, and/or 2E illustrate a method for providing image recommendations, in accordance with one or more implementations.

FIG. 2A illustrates a method 200-a, in accordance with one or more implementations.

An operation 202 may include receiving a set of images from one or more image sources (e.g., image servers). Operation 202 may be performed by one or more hardware processors configured by machine-readable instructions including a module that is the same as or similar to set receiving module 108, in accordance with one or more implementations.

An operation 204 may include accessing a context segment graph including one or more nodes. In some cases, each node may be associated with at least one segment. Further, the at least one segment may be selected from a group consisting of an interest, a business segment, or an audience segment. Operation 204 may be performed by one or more hardware processors configured by machine-readable instructions including a module that is the same as or similar to context segment graph accessing module 110, in accordance with one or more implementations.

An operation 206 may include identifying, from the set of images, a subset of images related to a node in the context segment graph. Operation 206 may be performed by one or more hardware processors configured by machine-readable instructions including a module that is the same as or similar to subset identifying module 112, in accordance with one or more implementations.

An operation 208 may include receiving, from at least one user, user responses for the subset of images. In some cases, each user response includes a relatedness value and a responsiveness value for an image from the subset of images in context to the node in the context segment graph. Operation 208 may be performed by one or more hardware processors configured by machine-readable instructions including a module that is the same as or similar to user response receiving module 114, in accordance with one or more implementations.

An operation 210 may include generating one or more models for predicting image performance based in part on the user responses. Operation 210 may be performed by one or more hardware processors configured by machine-readable instructions including a module that is the same as or similar to model generating module 116, in accordance with one or more implementations.

An operation 212 may include receiving a plurality of candidate images for a creative campaign. Operation 212 may be performed by one or more hardware processors configured by machine-readable instructions including a module that is the same as or similar to candidate image receiving module 118, in accordance with one or more implementations.

An operation 214 may include determining, using at least one model of the one or more models, a first set of metrics for each candidate image of the plurality of candidate images in context to the node. Operation 214 may be performed by one or more hardware processors configured by machine-readable instructions including a module that is the same as or similar to metrics determination module 124, in accordance with one or more implementations.

An operation 216 may include display a listing of the plurality of candidate images. In some cases, the listing comprises the first set of metrics for each of the plurality of candidate images. In some examples, the first set of metrics for each candidate image includes at least a confidence score and one or more of a relatedness value and a responsiveness value in context to the node. Operation 216 may be performed by one or more hardware processors configured by machine-readable instructions including a module that is the same as or similar to candidate image display module 126, in accordance with one or more implementations.

Figure 2B:
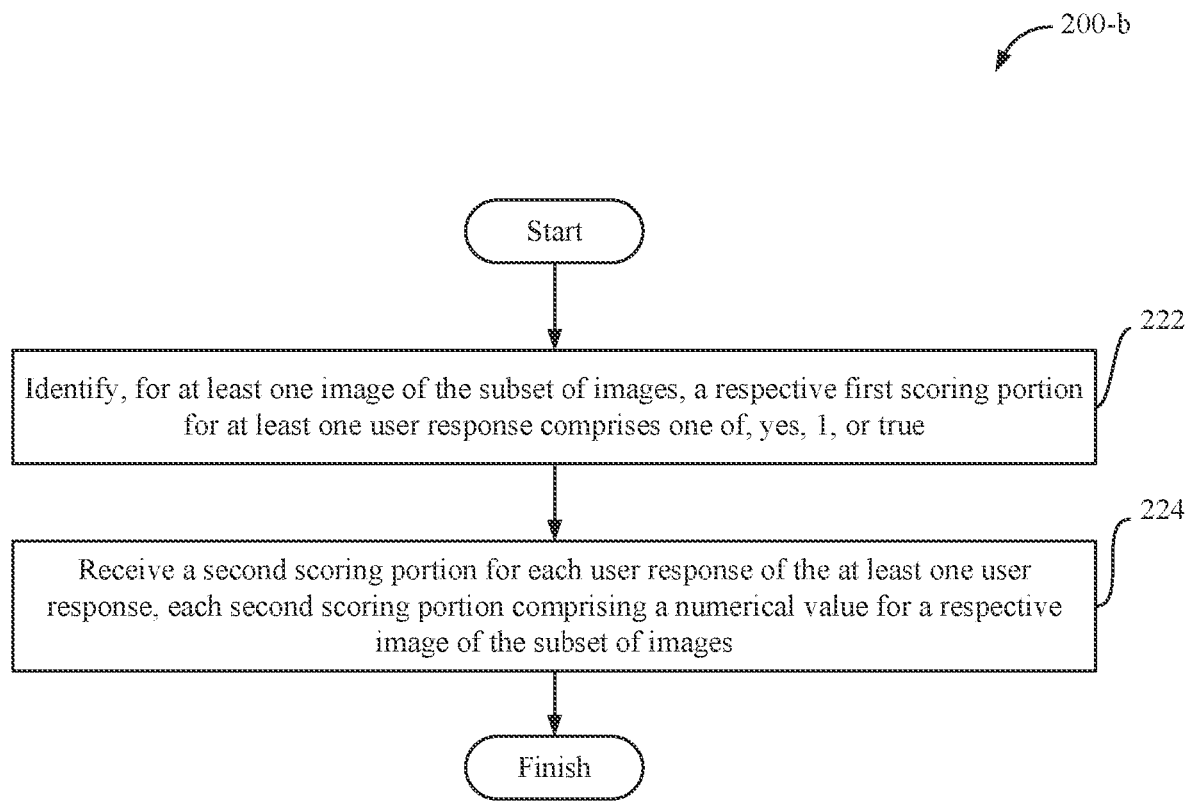

FIG. 2B illustrates a method 200-b, in accordance with one or more implementations.

An operation 222 may include identifying, for at least one image of the subset of images, a respective first scoring portion for at least one user response includes one of, 'yes', '1', 'true', or 'related'. Operation 222 may be performed by one or more hardware processors configured by machine-readable instructions including a module that is the same as or similar to scoring portion module 130, in accordance with one or more implementations.

In some cases, each user response is defined using a first scoring portion and a second scoring portion, where the second scoring portion may be conditional on the first scoring portion. For instance, users or audience members may be prompted for their opinion on if an image from the subset of images is a) related to a given context and b) if so, how they would rate the use of that image given the context. In some cases, a user may respond to the first prompt a) with a binary value (e.g., 'Yes' or 'No', 'Related' or 'Unrelated', etc.). Further, a user may only respond to the second prompt b), for instance, with a numerical value or score (e.g., from 1 to 5, from 0 to 10, etc.), if the response to prompt a) was positive. A user response for relatedness (i.e., first scoring portion) is "positive" when the user response indicates that a particular image is related to a given context. As used herein, the first scoring portion includes the response to the first prompt a), while the second scoring portion includes the response to the second prompt b).

An operation 224 may include receiving a respective second scoring portion for each user response of the at least one user response. Each second scoring portion may include a numerical value for a respective image of the subset of images. Further, each numerical value may be rated on a scale between a lower bound and an upper bound, such as between 0 and 1, between 0 and 100, between 0 and 10, between 1 and 10, etc., to name a few non-limiting examples. In some cases, each numerical value may be associated with a responsiveness to the node. In some examples, the first scoring portion comprises the relatedness value and the second scoring portion comprises the responsiveness value. Operation 224 may be performed by one or more hardware processors configured by machine-readable instructions including a module that is the same as or similar to scoring portion module 130, in accordance with one or more implementations.

Figure 2C:
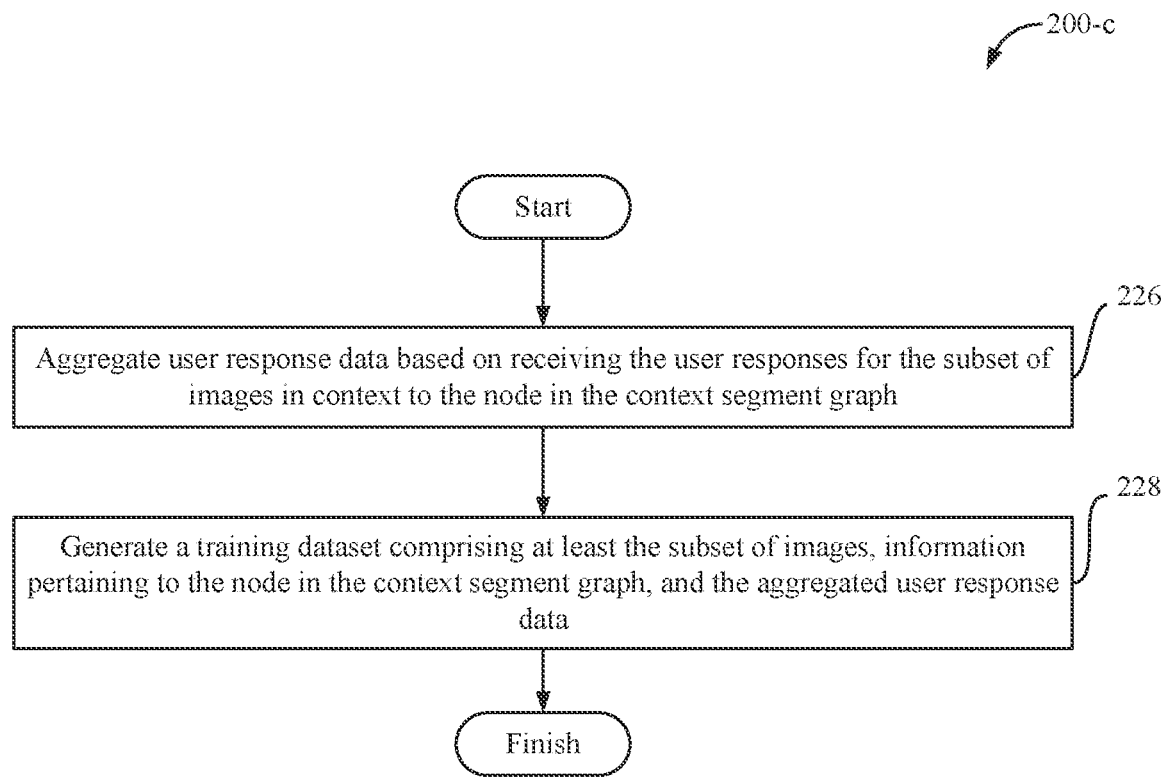

FIG. 2C illustrates method 200, in accordance with one or more implementations.

An operation 226 may include aggregating user response data based on receiving the user responses for the subset of images in context to the node in the context segment graph. Operation 226 may be performed by one or more hardware processors configured by machine-readable instructions including a module that is the same as or similar to user response data aggregation module 132, in accordance with one or more implementations.

An operation 228 may include generating a training dataset including at least the subset of images, information pertaining to the node in the context segment graph, and the aggregated user response data. Other types of information may be utilized to generate the training dataset in different embodiments, and the examples listed herein are not intended to be limiting.

In some cases, the aggregated user response data may be linked to a relatedness value/score and responsiveness value/score for the node. In some embodiments, the training dataset may be used to encode a classifier (e.g., machine learning classifier), where the classifier may utilize the images (e.g., 5000 images, 10000 images, etc.) and the relatedness and responsiveness values received from users to generate a similarity function or similarity measure. In some cases, a similarity function may be used to measure how similar or related two objects (e.g., images) are. After training the classifier (or machine learning algorithm) using the training dataset, the classifier may be employed to predict image performance for one or more candidate images. As an example, the system of the present disclosure may be used to compare the predicated performance of two or more candidate images given a context, such as "fitness". In this case, the classifier may determine a similarity measure or similarity function for the two or more candidate ad images with respect to images (i.e., from the training dataset) that were scored highly given the "fitness" context. In one non-limiting example, the training dataset may be used to train the classifier or machine-learning algorithm to identify attributes of images, for instance, using pixel related information for the images. Further, the classifier may link or map the human survey data (e.g., relatedness and/or responsiveness values) for the images from the training dataset to their respective pixel related information. In some cases, the classifier may assign a higher score to a candidate image that shares one or more characteristics/features with one or more high scoring images from the training dataset given the same context. Similarly, candidate ad images that are dissimilar (e.g., in pixel related information) from high scoring images from the training dataset and given the same context may be assigned a lower score. In this way, the classifier may utilize human survey data as a proxy to predict ad performance. Operation 228 may be performed by one or more hardware processors configured by machine-readable instructions including a module that is the same as or similar to training dataset generating module 134, in accordance with one or more implementations.

Figure 2D:
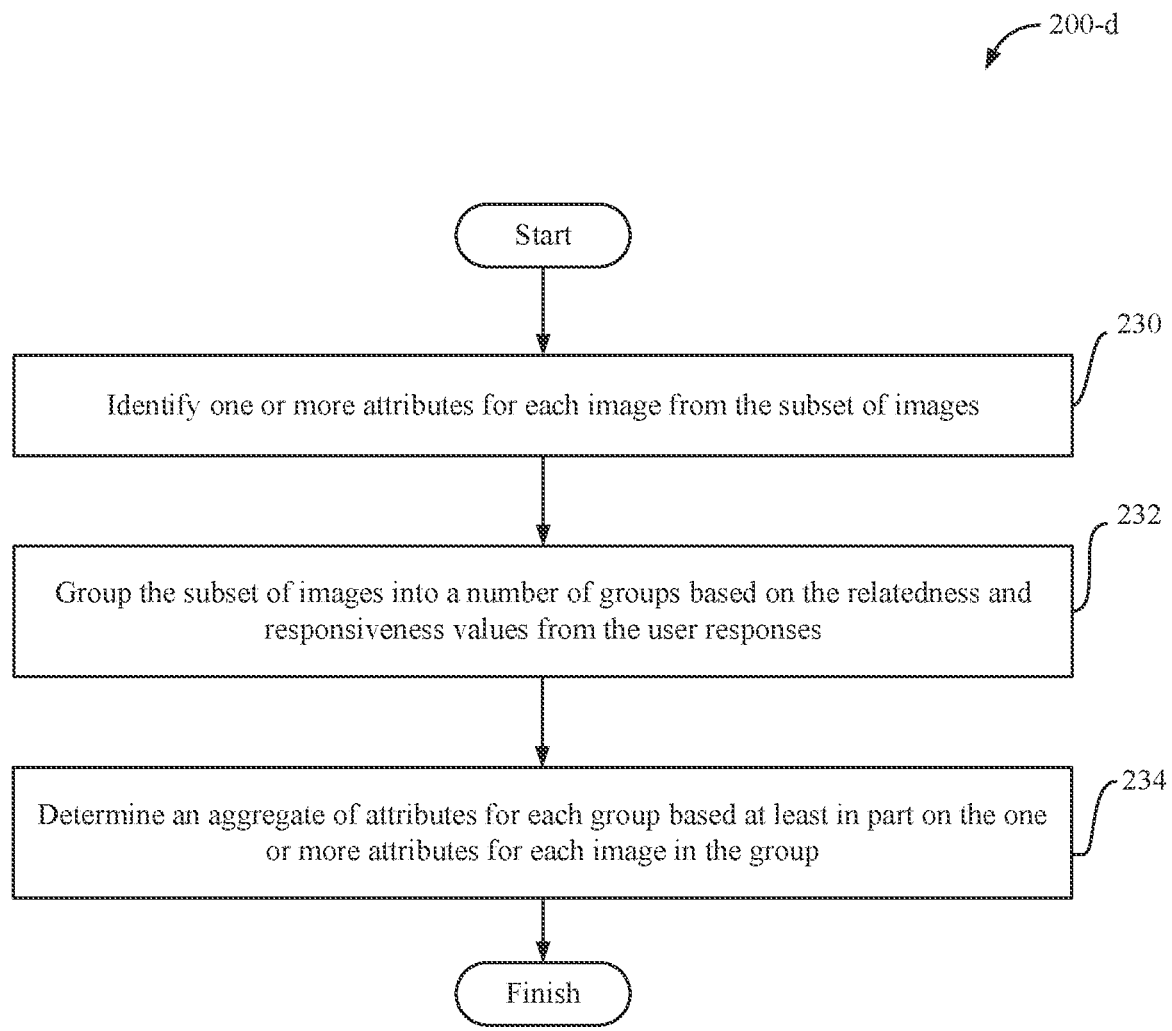

FIG. 2D illustrates a method 200-*d*, in accordance with one or more implementations.

An operation 230 may include identifying one or more attributes for each image from the subset of images, wherein the one or more attributes include one or more of pixel related information, stylistic information, an image vector, keyword metadata or tags, and human labels. In some cases, the image vector may represent one or more objects and corresponding locations within the image. The image vector may be determined using a computer-operated convolutional neural network (CNN). In some cases, the human labels may include one or more of the first scoring portion (e.g., relatedness value) and the second scoring portion (e.g., responsiveness value). In some cases, the human labels may also include one or more descriptive terms or phrases for an image from the subset of images. For instance, an image of a plane taking off may be associated with one or more descriptive terms or phrases such as "vacation", "holiday", an airline name, an airport name, etc. Operation 230 may be performed by one or more hardware processors configured by machine-readable instructions including a module that is the same as or similar to image attributes module 128, in accordance with one or more implementations.

An operation 232 may include grouping the subset of images into a number of groups based on the relatedness and responsiveness values from the user responses. Operation 232 may be performed by one or more hardware processors configured by machine-readable instructions including a module that is the same as or similar to user response receiving module 114, in accordance with one or more implementations.

An operation 234 may include determining an aggregate of attributes for each group based at least in part on the one or more attributes for each image in the group. Operation 234 may be performed by one or more hardware processors configured by machine-readable instructions including a module that is the same as or similar to image attributes module 128, in accordance with one or more implementations.

Figure 2E:
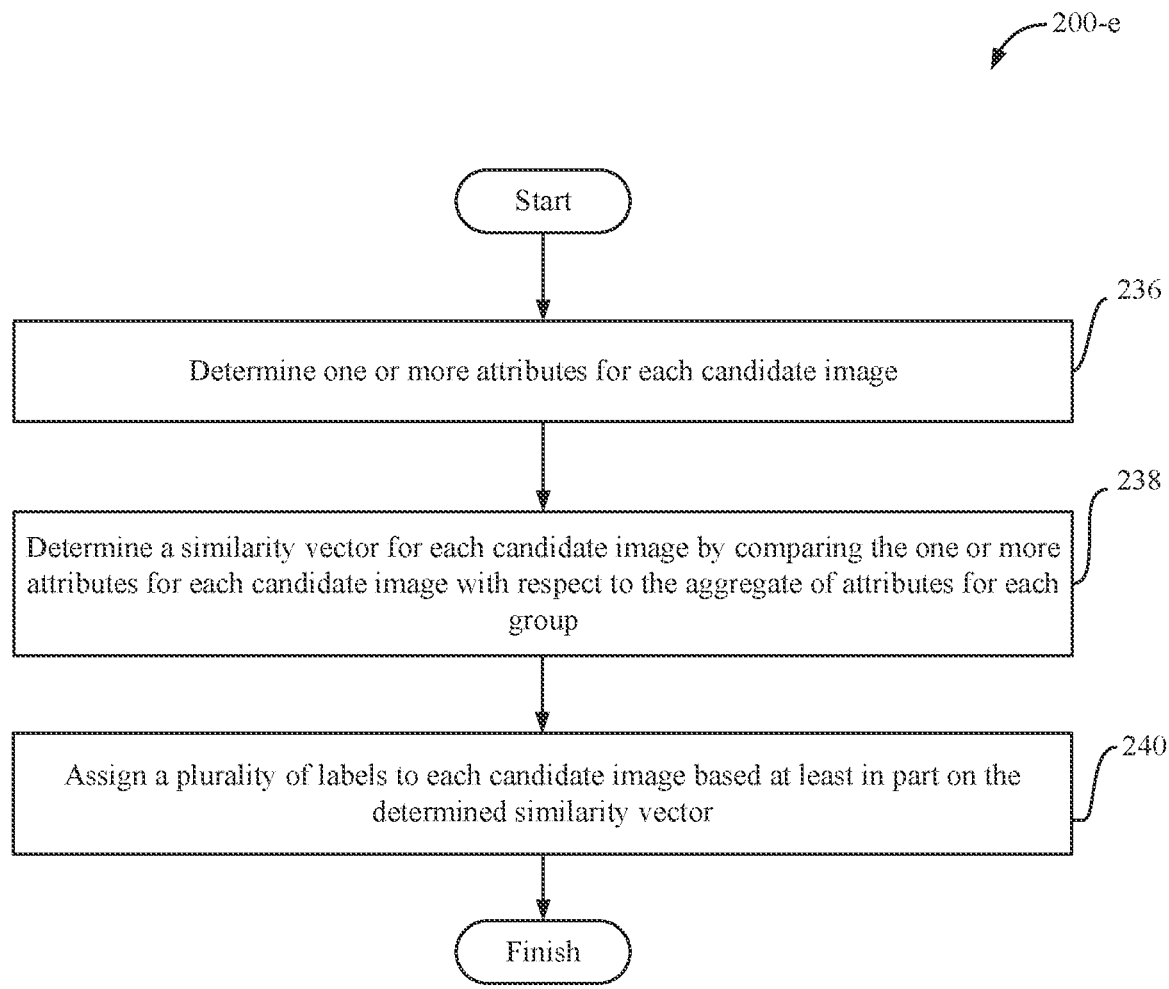

FIG. 2E illustrates a method 200-*e*, in accordance with one or more implementations.

An operation 236 may include determining one or more attributes for each candidate image. In some cases, the one or more attributes include one or more of pixel related information, stylistic information, an image vector, keyword metadata or tags, and human labels. Operation 236 may be performed by one or more hardware processors configured by machine-readable instructions including a module that is the same as or similar to image attributes module 128, in accordance with one or more implementations.

An operation 238 may include determining a similarity vector for each candidate image by comparing the one or more attributes for each candidate image with respect to the aggregate of attributes for each group. In some other cases, the system 100 may determine an average (or mean) of the image vectors for each group, compare the image vector for each candidate image with the average/mean of the image vectors for each group, and determine a plurality of similarity vectors, one for each group. In some cases, the similarity vector (also referred to as a similarity measure, or similarity score) may be used to compare how alike two data objects (e.g., two images) are. Although not necessary, in some cases, similarity may be measured in the range from 0 to 1, where a similarity of 1 indicates that the two data objects are identical, while a similarity of 0 indicates that the two data objects are dissimilar. Operation 238 may be performed by one or more hardware processors configured by machine-readable instructions including a module that is the same as or similar to image attributes module 128, in accordance with one or more implementations.

An operation 240 may include assigning a plurality of labels to each candidate image based at least in part on the determined similarity vector (i.e., similarity score or measure), wherein the plurality of labels include a confidence score, a relatedness value, and a responsiveness value for a candidate image in context to the node. In some examples, the system 100 may compare an image vector for a candidate image with the average (or mean) of the image vectors for each group and determine how similar or dissimilar the candidate image is with respect to the images in that group. In some circumstances, the system 100 may then classify the candidate image to the group that it best matches with (i.e., is most alike). Said another way, after classifying the image into a group based on the determined similarity measure, the system 100 may assign the candidate image similar (or the same) relatedness and responsiveness values as the images in the group. Operation 240 may be performed by one or more hardware processors configured by machine-readable instructions including a module that is the same as or similar to metrics determination module 124, in accordance with one or more implementations.

Figure 3:
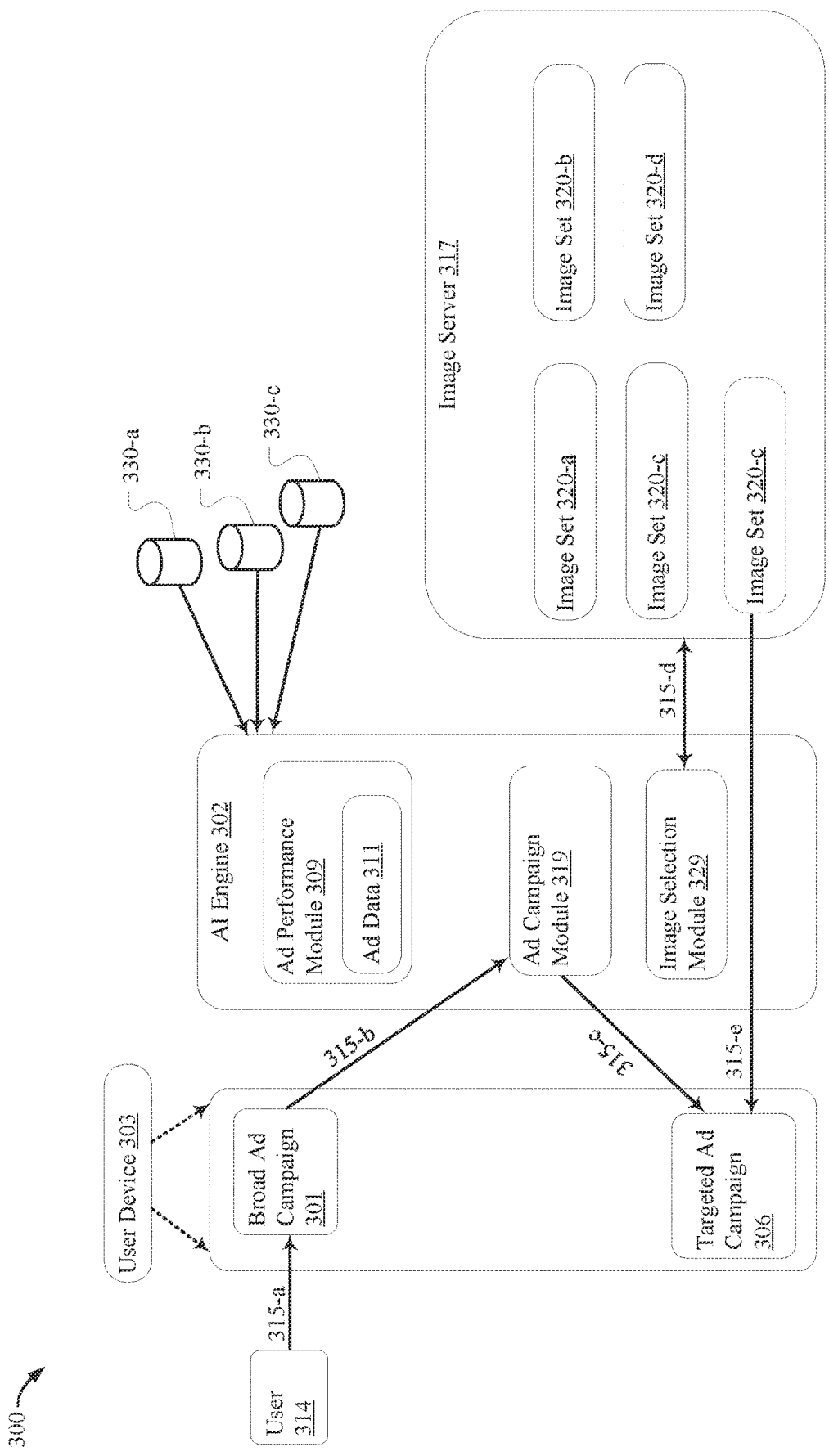
FIG. 3 illustrates a process flow for providing image recommendations, in accordance with one or more implementations.

FIG. 3 illustrates a process flow 300 for providing image recommendations, in accordance with one or more implementations. In some cases, process flow 300 implements one or more aspects of the figures described herein, including at least FIG. 1. In some examples, process flow 300 may be implemented by an image recommendation system, such as system 100, or any of systems 1400-1600.

In some cases, a user 314 may initiate (e.g., 315-a) a broad ad campaign 301 for an entity (e.g., a company or organization, a brand) from a user device 303. The user device 303 may be similar or substantially similar to the client computing platform 104 described in relation to FIG. 1. In this example, the ad campaign 301 may be broadly targeted to a general audience, irrespective of any interests, demographics, geographical location, age, etc. In some cases, the user device 303 may be one of electronically, logistically, and communicatively coupled to an AI engine 302. The AI engine 302 may be executed or hosted on a server, such as server 102 in FIG. 1. Additionally, or alternatively, the AI engine 302 may be one of electronically, logistically, and communicatively coupled to the server 102. In some cases, the AI engine 302 may be embodied using hardware, software, or a combination thereof. As seen, the AI engine 302 comprises an ad performance module 309, an ad campaign module 319, and an image selection module 329. The modules (i.e., ad performance module 309, ad campaign module 319, and image selection module 329) may implement one or more aspects of the modules previously described in relation to FIG. 1. Further, the modules in FIG. 3 may be embodied using hardware, software, or a combination thereof.

In some cases, the user 314 running the broad ad campaign 301 may utilize the AI engine 302 for fine tuning the campaign, for instance, to enhance click through rates (CTR) and/or decrease cost per acquisition (CPA), to name a few metrics. The AI engine 302 may analyze data from numerous sources (e.g., shown as data sources 330-a, 330-b, 330-c) across the internet to optimize ad campaign performance. In some cases, the AI engine 302 may scan and analyze datasets pertaining to ad impression opportunities and/or historical clearing prices across first-price auction environments, for instance, to choose an optimal bid for impressions and leverage audience insights to provide real-time recommendations, to name two non-limiting examples. One non-limiting example of an AI engine includes the KOA ARTIFICIAL INTELLIGENCE developed by THETRADEDESK. In some examples, the AI engine 302 utilizes bid factors (e.g., a multiplier applied to a base bid to adjust the bid sent out to an ad exchange) to focus on top-performing websites, geo locations, and/or recency. In other cases, the AI engine 302 may utilize line items, rather than bid factors, to determine an audience segment/cohort to focus on. In either case, the AI engine 302 may recommend specific audience segments for prioritizing ad spending on to the user 314.

In some embodiments, the ad performance module 309 of the AI 302 may receive ad data 311 from the plurality of data sources 330. The ad campaign module 319 of the AI engine 302 may also receive information pertaining to the broad ad campaign 301 from the user device 303 when the user 314 initiates 315-a the broad ad campaign. In some cases, the information may include an indication of a brand or company name, and/or a segment category (e.g., fitness, food, fashion, travel, etc.) to name two non-limiting examples. For instance, if the user 314 is running the broad ad campaign 301 for a fitness brand, the information may include the name of the brand and/or the segment category (i.e., fitness). In some examples, the AI engine 302 may analyze the ad data 311 received from the plurality of data sources 330 and the information pertaining to the broad ad campaign 301 to provide a recommendation for a targeted ad campaign. As seen, the ad campaign module 319 may transmit a message (e.g., 315-c) to the user device 303, where the message includes the recommendation for the targeted ad campaign 306. As an example, a user running a broad ad campaign 301 for an outdoor and fitness brand may determine that "people who enjoy running" are responding well to the broad campaign 301 based on the analysis and recommendation provided by the AI engine 302. In this case, the user 314 may determine that a targeting ad campaign 306 focusing specifically on runners may serve to optimize ad performance (e.g., reduce cost per acquisition (CPA), reduce cost per click (CPC), increase revenue of organization, increase net income, etc.).

In some examples, the user 314 may also utilize the AI engine 302 to receive image recommendations for running the targeted ad campaign 306. In some embodiments, the AI engine 302 may be used to identify optimized image(s) to use in the targeted ad campaign 306, for instance, based on aggregating and analyzing human responsiveness and/or relatedness data. The AI engine 302 may classify and label images (e.g., candidate ad images) from one or more sources (e.g., social media, websites, image group boards or forums, stock image sites, etc.) based on their predicted performance with the different audience or focus groups. For instance, the AI engine 302 may be used to predict image performance for "a people who enjoying running" audience segment, since running enthusiasts are responding well to the broad campaign 301. In some embodiments, after receiving a plurality of candidate images from one or more image sources (e.g., image sets 320-a through d, image collections uploaded by the user, images from other websites or social media, royalty-free or stock images, etc.), the AI engine 302 may run one or more models, for instance, an ad score model. In some examples, different types of models may be utilized based on the target audience, audience segment or cohort, etc. For instance, a "health and fitness" audience model or a "running" model may be used to shortlist an image or subset of images that users from a "health and fitness" or "running" audience group might find more appealing given a certain context, such as "Treadmills". In other words, given an image or set of images, what would a person (e.g., general audience, social media user, particular interests user, etc.) think of said image (or set of images) in a specific context.

In some cases, the AI engine 302 may comprise the image selection module 329, which may be in communication with an image server 317 over a bi-directional communication link (e.g., 315-d). In some cases, the image server 317 may store or receive a plurality of image sets (e.g., image set 320-a, image set 320-b, image set 320-c, image set 320-d, etc.) from one or more image sources, where each image set includes at least one image. The image selection module 329 may analyze the plurality of images from the plurality of image sets 320 and determine optimized image(s) for use in the targeted ad campaign 306. In some cases, after determining the optimizing image(s) for use in the targeted campaign 306, at least one image from the optimized image(s) (e.g., from image set 320-c) may be uploaded 315-e for the targeted ad campaign 306.

Figure 16:
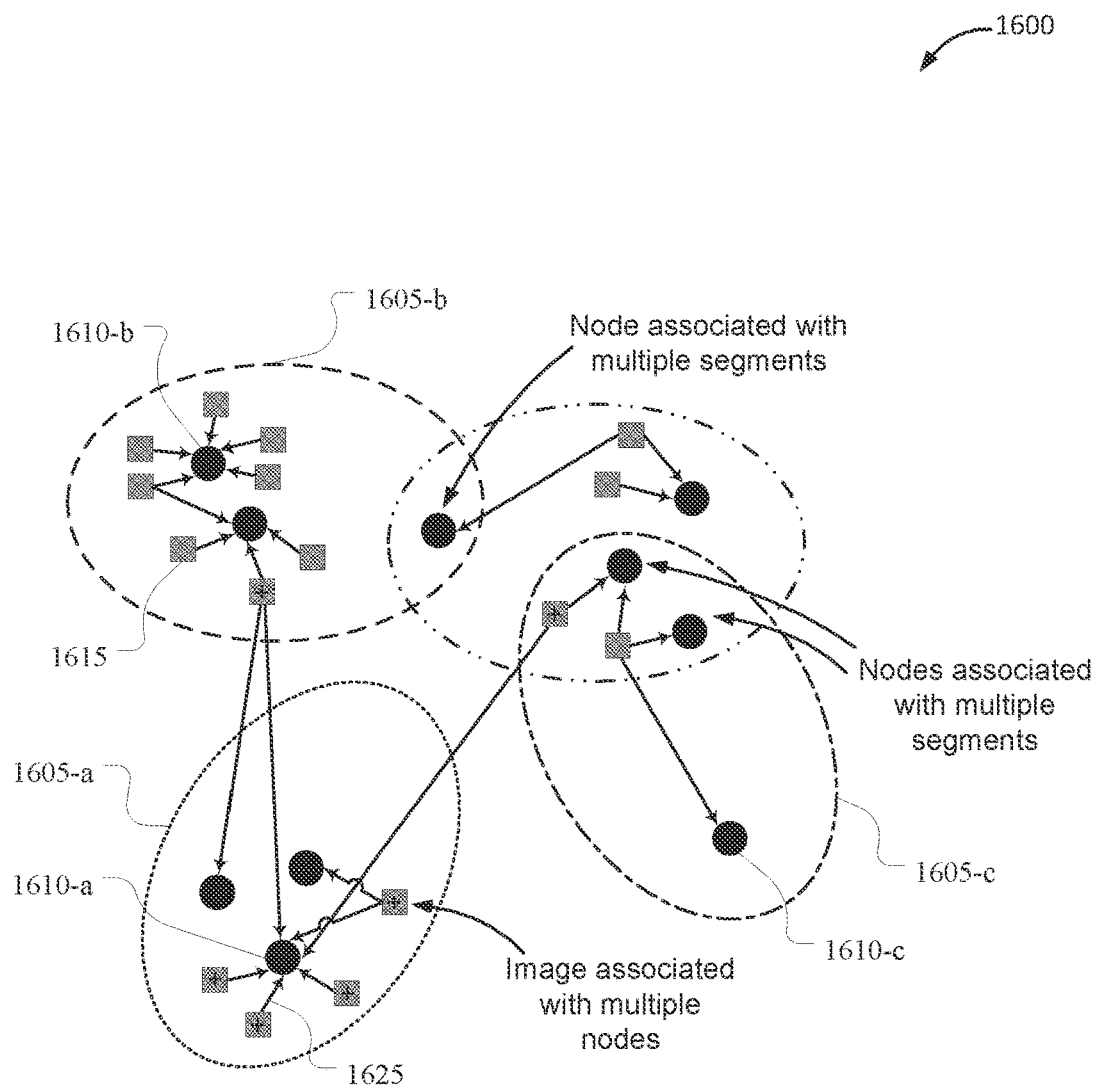
FIG. 16 illustrates an example of a context segment graph, in accordance with various aspects of the disclosure.

Turning now to FIG. 16, which is a simplified illustration of a context segment graph 1600, in accordance with various aspects of the disclosure. For sake of brevity, the context segment graph 1600 only includes a small number of nodes, images, and segments. As can be appreciated, a context segment graph 1600 may include tens or even hundreds of nodes and segments and thousands or even millions of images. As seen, the context segment graph 1600 comprises a tree-like structure with a plurality of nodes and branches, where each branch and/or node is associated with at least one segment. In the example shown, the context segment graph 1600 comprises one or more nodes 1610 (e.g., node 1610-a, node 1610-b, node 1610-c, etc.), where each node is associated with at least one segment (e.g., segment 1605-a, segment 1605-b, segment 1605-c, etc.) in the graph 1600. In some examples, a node may be associated with multiple segments (also referred to as segment categories). Further, nodes of the context segment graph may be associated with one or more images from a set of images. In this illustration, the set of images may comprise the union of all grey squares (i.e., with and without the '+' signs). In other words, the set of images may include the images 1615 and the subset of images 1616. In some instances, an image may be associated with multiple nodes, where the nodes may be associated with the same or different segment categories. In some examples, arrows 1625 depict the association between an image and a node 1610.

In some embodiments, the system (e.g., system 100 in FIG. 1, system 1400 in FIG. 14) may access the context segment graph 1600 from a third-party system, such as an ad targeting system or server (e.g., remote computing platform 104 in FIG. 1). The system may also receive the set of images from one or more image sources, for instance, an image server (e.g., shown as image server 317 in FIG. 3). In some instances, the system may prompt one or more users to indicate relatedness and/or responsiveness values for one or more images in relation to a node. For example, the system may prompt one or more users to indicate a relatedness and/or responsiveness for the subset of images 1616 in relation to the node 1610-a. The system may also prompt the same or a different set of users to indicate a relatedness and/or responsiveness for one or more images 1615 in relation to the other nodes 1610 (e.g., node 1610-b, node 1610-b, etc.). The user responses may be aggregated by the system and utilized to generate one or more models (e.g., ad score models). Some non-limiting examples of ad score models may include a social media model, an interests model (e.g., health and fitness model, fashion model, pop music model, professional football model), a business segment model (e.g., outdoor apparel model, travel model, restaurants and bars model), etc. In some instances, the generated models may be used to create and run predictions for image performance in a creative campaign, such as an ad campaign.

In some cases, the system may identify a subset of images (e.g., subset of images 1616) associated with a node (e.g., node 1610-a) in the context segment graph 1600. As an example, the segment 1605-a in context segment graph 1600 may be associated with the category "Fitness", and the node 1610-a with "Running". In some embodiments, human survey data may be aggregated for the one or more images in the subset of images, where the human survey data may be in context to the node 1610-a in the graph 1600, further described below and in relation to FIG. 8.

In some embodiments, audience members (e.g., social media users, e-commerce or online shopping users, general internet users, etc.) may be asked for their feedback on a plurality of images (e.g., subset of images 1616) given a certain context. For instance, general audience members may be requested feedback on a plurality of images for a context "Beach Holiday". In another example, audience members falling into a certain category, such as live music fans, may be requested feedback on a plurality of images given a context "music festival". In some cases, the human survey data may include this context-specific feedback collected from a plurality of audience members for a plurality of images. In some examples, this context-specific feedback and the subset of images may be input as a training dataset to a classifier. The classifier may utilize an artificial intelligence (AI) algorithm, such as a Convolutional Neural Network (CNN), to generate at least one Machine Learning (ML) model using the training dataset. As can be appreciated, the ML models may be continuously refined and updated as more and more human subjective responses and associated images are fed into the classifier.

In some cases, human labels (e.g., relatedness value, responsiveness value) may be acquired from the audience on a subset of images associated with a particular segment. In some circumstances, utilizing feedback from a large number of users may help make the AI algorithm's predictions more accurate. For instance, the number of images (e.g., 5,000, 10,000, etc.) and human subjective labels (e.g., 30,000 labels, 50,000 labels, etc.) may impact the accuracy of a particular model in predicting image performance for a creative, such as an ad. In some circumstances, when an AI algorithm classifies a new image (i.e., an image that is not in the training dataset) into a certain class or group, it may also provide a confidence score for that prediction. In some aspects, the confidence score may serve as a quantitative metric for how accurate the AI algorithm is in classifying images.

In some cases, each user response may be defined in two parts or scoring portions, where a second scoring portion may be conditional on the first scoring portion. For instance, the first part or scoring portion may comprise a binary sample of human expectation of relatedness (e.g., a 'yes' or 'no', a '1' or '0', 'True' or 'False', 'related' or 'unrelated', to name a few non-limiting examples) of images from the subset of images 1616 in context to the node. In some cases, the responses may be collected from random audience members. In other cases, the responses may be collected from audience members falling into a particular segment or audience cohort (e.g., having a particular interest, such as nature, photography, fitness, running, art, music, etc.). If the first scoring portion is "Yes" or "True", the user may be prompted to grade, given the same context, the image on a scale (e.g., between 0% and 100%, between 1 and 10, between 0 and 5, between 1 and 5, etc.) for the second scoring portion. In some cases, the second scoring portion may relate to a responsiveness (or response likelihood), where the responsiveness is rated on said scale In some cases, the AI algorithm may utilize a ML model to estimate a relatedness value, and optionally, a responsiveness value for a candidate image given a context, where the estimation may be based in part on comparing the attributes of the candidate image with attributes of images that were assigned a particular label (e.g., relatedness value, responsiveness value) in human survey responses given the same or similar context. As an example, the ML model may assign a relatedness value of 'Yes' and a responsiveness value of '5/5' for an image (e.g., an image of yellow flower)

given a certain context (e.g., nature) based on comparing the attributes (e.g., stylistic information, compositional information, image vector, pixel related information, etc.) of the image with attributes of other images (e.g., trees, red flowers, beach, mountains, tulips, roses, buildings, vehicles, etc.) that were scored for relatedness and responsiveness given the context "nature". In this example, the ML model may have determined that the image of the yellow flower has one or more features that are similar to the features in the images of the trees, red flowers, tulips, and/or roses from the training dataset. The ML model may also determine that those images from the training dataset were on average rated "Yes" for relatedness and scored "5/5" for responsiveness given the context "nature". Further, the ML model may determine that the image of the yellow flower is least like the images of buildings and vehicles from the training dataset that were on average rated "No" for relatedness given the context "nature". In this way, the ML model may assign the relatedness and responsiveness value labels for the yellow flower image based on how similar or dissimilar it is to images in the training dataset given the same or similar context.

Thus, the image classification pipeline may be seen as comprising an input training dataset having the subset of images 1616 (e.g., N images) and a context (e.g., the node 1610-a), where each image from the subset of images 1616 is labeled with one of K different classes or groups. In some cases, each group or class may be associated with a relatedness value and optionally a responsiveness value. For instance, a first class or group may be associated with a "Yes" for relatedness and "5/5" for responsiveness, a second class or group may be associated with a "No" for relatedness, a third class or group may be associated with a "Yes" for relatedness and "1/5" for responsiveness, and so on.

Figure 4:
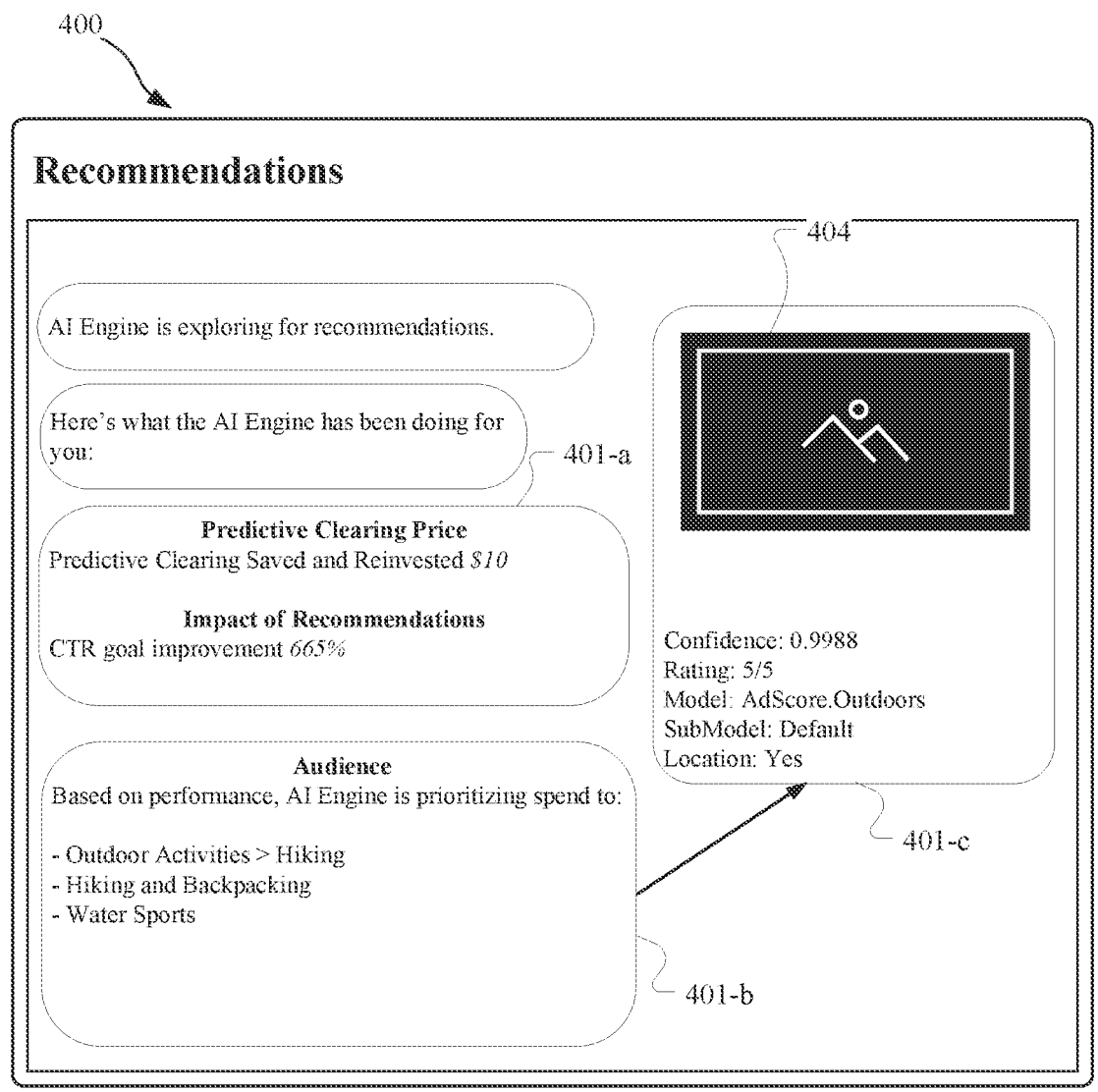
FIG. 4 illustrates an example of a user interface, in accordance with one or more implementations.

FIG. 4 illustrates an example of a user interface (UI) 400, in accordance with one or more implementations. In some examples, UI 400 implements one or more aspects of the figures described herein, including at least FIG. 3. UI 400 may be associated with an AI engine, such as AI engine 302 in FIG. 3. Alternatively, a user device (e.g., smartphone, tablet, laptop, etc.) used to display UI 400 may receive information for rendering the UI from a server (e.g., server 102) linked to the AI engine 302. One non-limiting example of an AI engine includes the KOA ARTIFICIAL INTELLIGENCE developed by THETRADEDESK. Other types of AI engines known in the art may be utilized in different embodiments, and the examples listed herein are not intended to be limiting. In some examples, the AI engine may be one electronically, logistically, and communicatively coupled to an ad targeting system or server. The ad targeting server may provide ad performance data for different sectors or segments to the AI engine. The AI engine may then analyze the ad performance data and display one or more recommendations for further enhancing ad performance. For instance, an outdoor and fitness brand may sell products in numerous categories, such as, summer outdoor activities (e.g., hiking boots, trekking poles, trail running shoes, compass, backpacks, kayaks, paddleboards, etc.), winter outdoor activities (e.g., snowboards, skis, goggles), and indoor fitness (e.g., gym apparel, dumbbells, etc.). In some embodiments, the AI engine 302 in FIG. 3 may analyze ad performance data and identify a certain segment category (e.g., summer outdoor activities) to prioritize ad spending on to maximize returns on ad spending, for example.

As shown, the UI 400 may comprise one or more display boxes 401 (also referred to as windows 401). Further, UI 400 may display one or more of a predictive clearing price and an impact of recommendations in a first display box 401-a. In the example shown, the UI 400 displays the predictive clearing saved and reinvested (e.g., $10) and Click-through-Rate (CTR) goal improvement by use of the AI engine in the display box 401-a. In some cases, the UI 400 may also provide audience or segment spending suggestions in another display box 401-b. For instance, display box 401-a indicates that the AI engine (e.g., shown as AI engine 302 in FIG. 3) recommends prioritizing spending to the summer outdoor activity segment (e.g., hiking, backpacking, water sports) based on current ad performance.

In some instances, the UI 400 also displays predicted performance values for an uploaded image 404 in a third display box 401-c. As shown, the AI engine or the classifier predicts a confidence score of "0.9988" and a rating of "5/5" for the image 404 while using the "AdScore.Outdoors" model and a Default SubModel. In some examples, the AI engine or classifier may allow a user to run predictions for image performance using different models and submodels, for instance, based on the given context. In some cases, a model may be referred to as a top-level model when it has multiple submodels below it in hierarchy. For instance, a top-level model may include a "Health and Fitness" model or an "Outdoor Activity" model. Further, a submodel for the "Health and Fitness" model could be "running" (extended to the subcategory) and/or a demographic (e.g., older audience vs millennial), to name two non-limiting examples. Similarly, submodels for the "Outdoor Activity" model may include "Summer Activity" submodel, "Winter Activity" submodel, and "Default" submodel, where the "Default" submodel may combine elements of the "Summer Activity" and "Winter Activity" submodels, for instance. In this example, the AI engine has labeled the candidate image 404 with a value from 1 to 5. A rating of 5/5 implies that the AI engine predicts good performance for the image 404 given the "Outdoor Activity" context. It should be noted that, other rating scales (e.g., 1 to 10, 1 to 100, 0 to 100, etc.) are contemplated in different embodiments, and the examples listed herein are not intended to be limiting.

In the field of machine-learning, a confidence score is a measure of likelihood that the output (i.e., prediction) of the machine-learning model is correct and will satisfy a user's request. In some cases, confidence scores are rated on a scale (e.g., 0-1, 0-100, etc., where a higher value implies high confidence). Machine-learning models often output multiple predictions, where each prediction is associated with a confidence score. In some cases, the AI engine or classifier may assign labels (e.g., relatedness, responsiveness) to candidate images, where the values of the labels may be based in part on the ML model that was utilized. Said another way, the ML model utilized to assign labels to candidate images may be based in part on the given context (e.g., health and fitness, outdoor activities, fashion, etc.), which may help ensure that the human subjective classification labels are adequate and appropriate for the use case. In the example shown, the AI engine labeled the image 404 as a "5/5" when analyzed using the "AdScore.Outdoors" model. In this case, the confidence score is used to convey the likelihood (or how confident the AI engine is) regarding the "5/5" Rating label. A confidence score of 0.9988 out of 1 indicates that the AI engine is 99.88% confident that the "5/5" Rating label it assigned is accurate. It should be noted that, the AI engine may also have determined a confidence score for other ratings, for instance, a confidence score of 0.012 for a 1/5 rating, a confidence score of 0.18 for a 2/5 rating, a confidence score of 0.67 for a 3/5 rating, and a confidence score of 0.82 for a 4/5 rating. The AI engine may have labeled the image as "5/5" since that rating value was associated with the highest confidence score. It should be noted that the AI engine may predict different confidence scores and rating values for the same image (i.e., image 404) while using a different ML model.

In some examples, the 'Yes' or 'No' for Location in display box 401-c may refer to a location context. In some cases, location and/or social context may be other examples of models that may be used by the AI engine to predict image performance. Studies have shown that when an image has location context, e.g. is identifiable to an audience familiar with the location (e.g. a local storefront, or, say, the Statue of Liberty), recognition and response can be heightened. This can be used in combination with other segment cues to dramatically enhance user engagement with an image.

Figure 5:
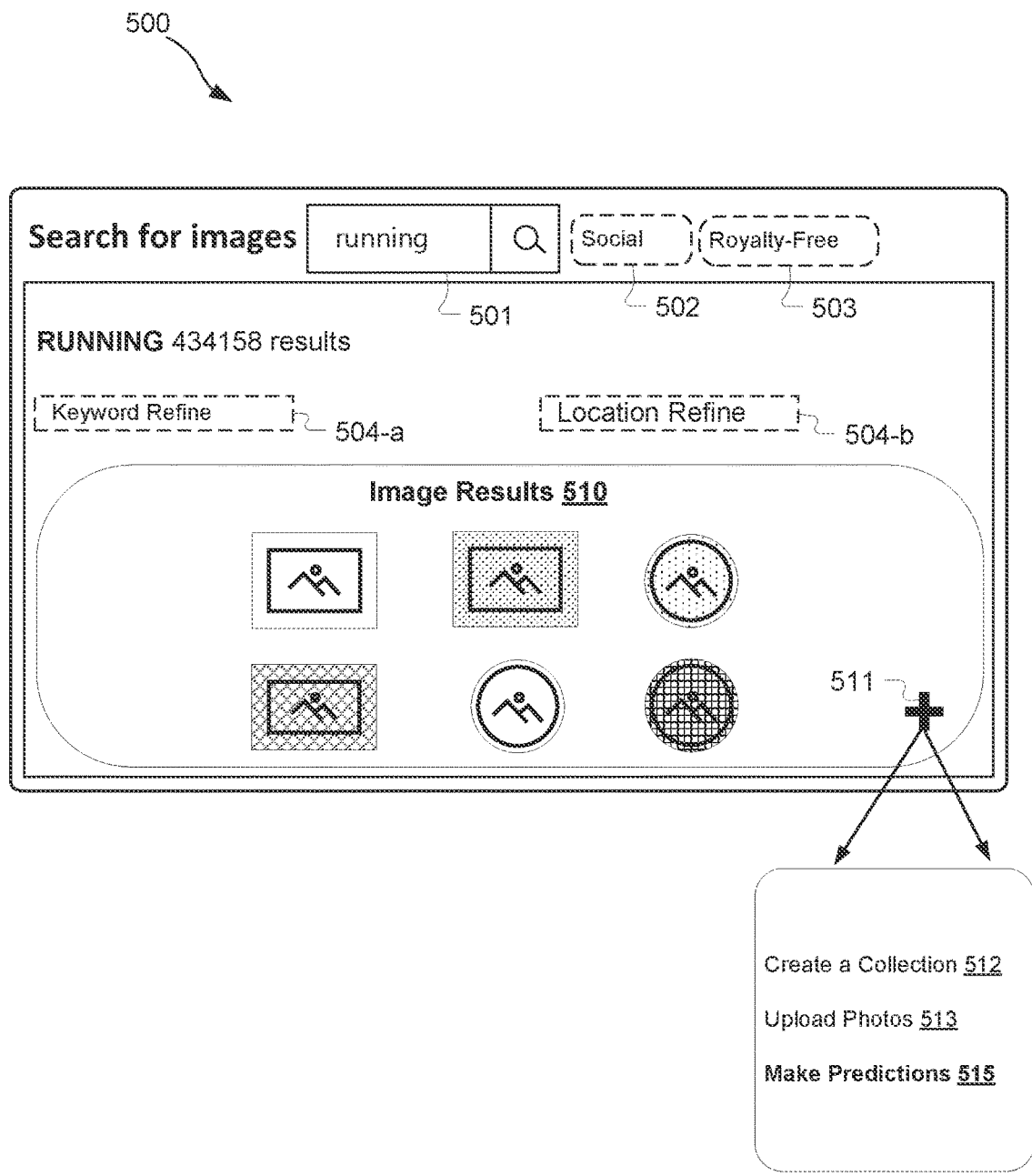
FIG. 5 illustrates an example of a user interface for the system in FIG. 1, in accordance with one or more implementations.
Figure 6:
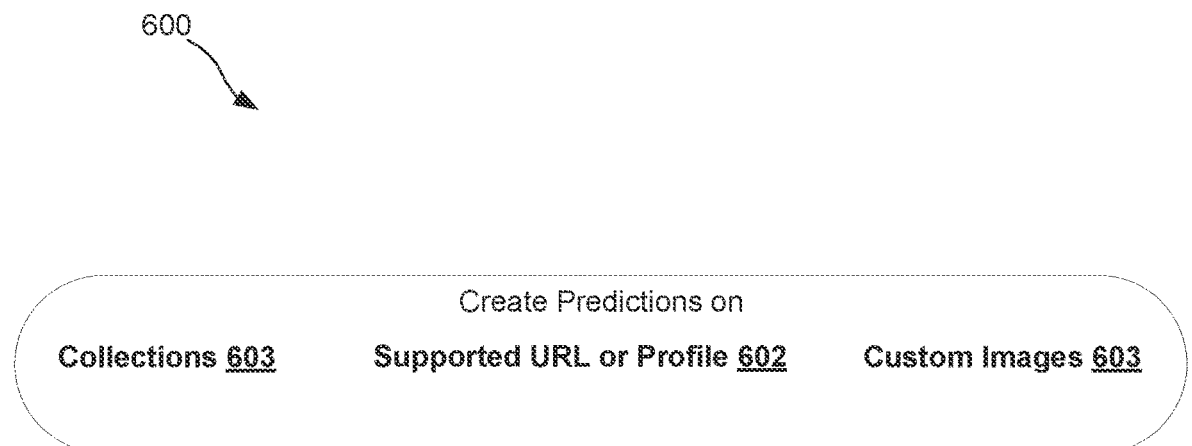
FIG. 6 illustrates an example of a user interface for the system in FIG. 1, in accordance with one or more implementations.

FIG. 5 illustrates an example of a UI 500, in accordance with one or more implementations. Furthermore, FIG. 6 illustrates an example of a UI 600, in accordance with one or more implementations. FIGS. 5 and 6 implement one or more aspects of the figures described herein, including at least FIGS. 1, 2A-2D, and 7-12.

As shown, UI 500 may allow a user to browse, search, and/or view images. For instance, a user may search for images related to a particular category or segment (e.g., running, food, fashion, music, art, nature, etc.) via a search box 501. In some cases, the UI 500 may also display one or more optional buttons (e.g., social button 502, royalty-free button 503—shown as optional by the dashed lines), which may allow the user to search for images from a particular source. In the example shown, the user may click on button 502 (shown as optional by the dashed lines) to search and view images from a social media platform, or button 503 to search and view images from a royalty-free source (e.g., stock images). In the example shown, the user has input the search query "running" into the search box 501 to view images related to people running, pre- and post-running food or drinks, running gear, running attire, etc., to name a few examples.

In some embodiments, the user may refine and/or filter search results using the UI 500. As shown, UI 500 displays optional two textboxes 504-a and 504-B which may enable the user to refine search results by adding keywords and a location, respectively. In some circumstances, input received in textboxes 504 (shown as optional by the dashed lines) may be used to narrow down the number of image results presented to the user. It should be noted that "keywords" and "location" are not the only types of filters that may be received from the user, and other types of filters are contemplated in different embodiments.

In some cases, UI 500 may be used to display the image results 510, where the image results 510 may be based in part on the search query input in search box 501 and (optionally) the refinements in textboxes 504. In some embodiments, the system of the present disclosure may also allow the user to perform one or more actions via the UI 500. In the example shown, the UI 500 displays a clickable icon 511 at the bottom right of the image results 510 window. Upon clicking the icon 511, the UI 500 may display a pop-up window showing one or more hyperlinks to the user. For instance, the UI 500 may enable the user to perform one or more actions by clicking on the hyperlinks. Some non-limiting examples of hyperlinks that may be presented to the user include one or more of: Create a Collection 512, Upload Photos 513, and Make Predictions 515.

In one non-limiting example, upon clicking Make Predictions 515 (shown in bold in FIG. 5), the user may be displayed a pop-up window, such as UI 600 in FIG. 6.

Turning now to FIG. 6, which displays an example of a UI 600, according to various embodiments of the disclosure. In some examples, UI 600 may allow the user to create predictions on images from one or more image sources, such as, but not limited to, image collections 601, a supported URL or profile (e.g., social media profile) 602, and/or custom images 603. In some cases, the system of the present disclosure may enable a user to create and save image collections, for instance, for user in a future ad campaign. Additionally, or alternatively, the system may also allow a user to view image collections 601 saved by another user. In some instances, the user may need to be granted access to view the image collection 601 of the other user. In some cases, the system may allow a user to predict performance for images from a variety of image sources, including, but not limited to, stock image or royalty-free collections, user uploaded images, and licensed images (e.g., from a social media website or platform, or any other applicable source).

Figure 7:
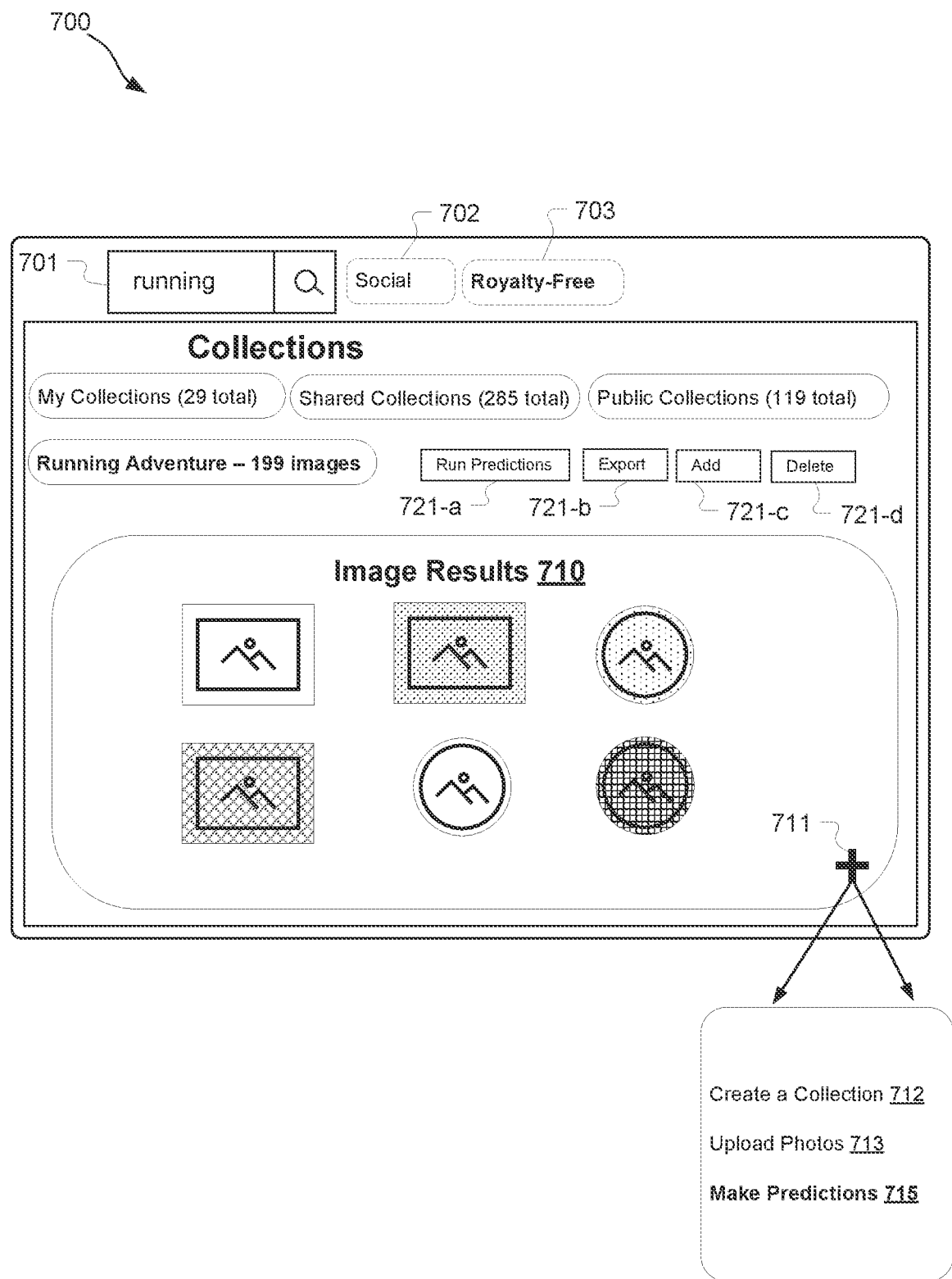
FIG. 7 illustrates an example of a user interface for the system in FIG. 1 in accordance with one or more implementations.

FIG. 7 illustrates an example of a user interface (UI) 700 for the system in FIG. 1, according to various embodiments of the disclosure. UI 700 may be displayed on a user device, such as a laptop, smartphone, tablet, etc., which may be similar or substantially similar to the remote computing platform 104 described in relation to FIG. 1. In the example shown, the user has entered a search query "running" into a search box 701, where the search box 701 is similar or substantially similar to the search box 501 in FIG. 5. Further, the user has selected "Royalty-Free" as the source by clicking on button 703 (shown in bold).

The UI 700 displays a number of image collections/folders on which the user can run image performance predictions. For instance, the UI 700 displays four image collections/folders, including the number of images in each collection (e.g., image set). As shown, UI 700 displays image results 710 from a Collection titled "Running Adventure" selected (shown in bold) by the user. In some cases, the UI 700 may also display details related to the other collections (e.g., My collections-29 total images; Shared collections-285 total images; Public collections-119 total images) available for use by that user. In this example, the user has selected to view the "Running Adventure" collection, which may have been previously saved/compiled by the user. As shown, the "Running Adventure" collection comprises a total of 199 images (or shots). Further, these images (or shots) may also be referred to as candidate images.

In some cases, the UI 700 may also display a search box 701 (i.e., similar to search box 501 in FIG. 1) and optional buttons 702 and 703 for selecting an image source (e.g., button 702 for selecting a social-media platform source, button 703 for selecting a royalty-free source). Furthermore, the UI 700 may also present one or more buttons 721, such as button 721-a (e.g., for running predictions), button 721-b (e.g., for exporting images from one image collection to another image collection), button 721-c (e.g., for adding images to an image collection), and/or button 721-d (e.g., for deleting images from an image collection), to name a few non-limiting examples. In some embodiments, the UI 700 may also enable the user to perform one or more other actions, for instance, by clicking on clickable icon 711. Clickable icon 711 may implement one or more aspects of the clickable icon 511, previously described in relation to FIG. 5. Upon clicking on the icon 711, a user may be presented with one or more links in the UI 700, such as a link 712 for creating a collection, a link 713 for uploading photos or images, and/or a link 715 for making image performance predictions.

Figure 8:
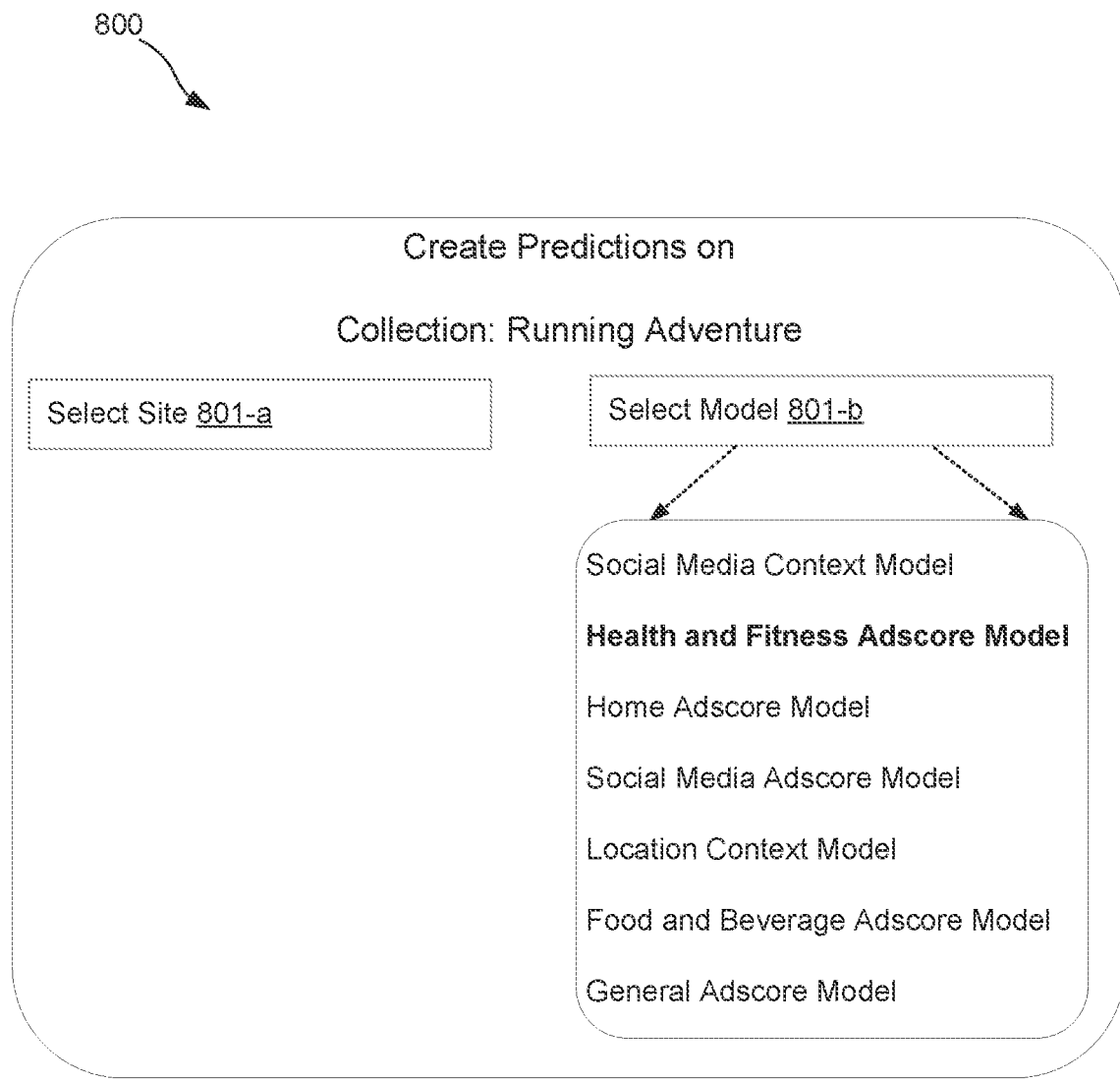
FIG. 8 illustrates an example of a user interface for the system in FIG. 1 in accordance with one or more implementations.

FIG. 8 illustrates an example of a UI 800 for the system in FIG. 1, according to various embodiments of the disclosure. UI 800 may enable a user to run one or more ML models for predicting image performance for candidate images from an image set (e.g., from a collection, such as the "Running Adventure" collection discussed in the preceding figures). In some examples, the ML model or classifier may assign one or more labels to the candidate images given a context, where the labels may be examples of human subjective classification labels. Some non-limiting examples of human subjective classification labels include a relatedness label (e.g., a binary sample, such as yes/no, related/unrelated, with regards to a candidate image and a given context) and a responsiveness label (e.g., a numerical value graded on a scale). As shown, the user interface 800 may comprise one or more buttons 801-a (e.g., Select Site for Running Predictions) and 801-b (e.g., Select Model for Running Predictions). In some examples, the UI 800 may display a dropdown menu, radio boxes, check boxes, etc., when the user clicks on the buttons 801, which may allow the user to input their selection. In the example shown, when the user clicks on button 801-b (i.e., Select Model for Running Predictions), the UI 800 displays a list of models that may be used to run predictions on candidate images in the "Running Adventure" Collection. As seen, the UI 800 allows the user to select at least one model for running the predictions. Some non-limiting examples of models include a context model (e.g., a social media context model for predicting how a candidate image will perform with a social media user given a context; a location context model for predicting how a candidate image will perform with users from a given location), and an ad score model (e.g., health and fitness adscore model, home adscore model, social media adscore model, food and beverage adscore model, general adscore model). In this example, the user has selected the Health and Fitness adscore model (shown in bold) since the given context is "running". It should be noted that, in some embodiments, multiple models (e.g., top-level models, sub-models) may be selected for creating and running predictions, which may allow the user to converge on a subset of images that rank highly in all models. Furthermore, as described above, the ML models (e.g., adscore models, context models, etc.) may be generated by aggregating human survey responses, such as responsiveness and relatedness data, to images given a node (e.g., interests, audience segments, business segments, etc.) and/or a context. The collected responses and the images (i.e., for which human survey responses were received) may be used to generate one or more training datasets, where the one or more training datasets may be fed into an AI or ML engine and used to generate the one or more models. In some cases, the AI or ML engine may be implemented as a convolutional neural network (CNN), although other types of deep learning principles are contemplated in different embodiments. As used herein, a CNN may refer to a deep learning algorithm which can take an input image, such as a candidate image, and capture spatial and temporal dependencies in the image through application of one or more relevant filters. In some embodiments, the CNN may help extract features (e.g., edges, color, gradient orientation, texture, etc.) from an image and classify the image (e.g., assign relatedness and responsiveness labels) based on the training dataset. The CNN may output the same types of labels as the labels included in the training dataset. For instance, the AI algorithm or classifier may assign candidate images with labels as to a relatedness (e.g., yes/no, 1/0, related/unrelated, etc.) and a responsiveness (e.g., may be represented as a number between 0 and 5, a percentage between 0 and 100%) given a context or a node in a context segment graph.

Figure 9:
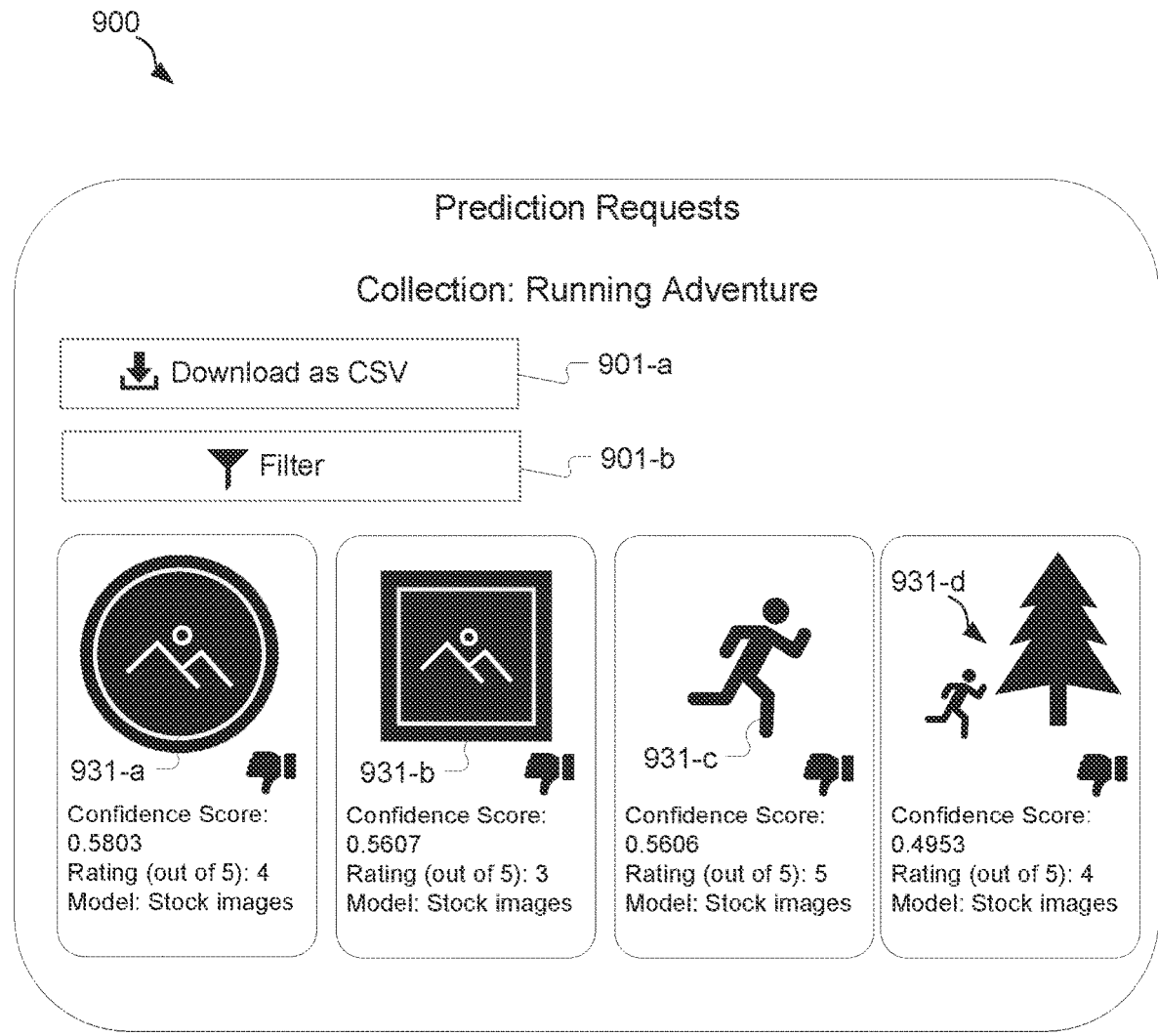
FIG. 9 illustrates an example of a user interface, in accordance with one or more implementations.
Figure 10:
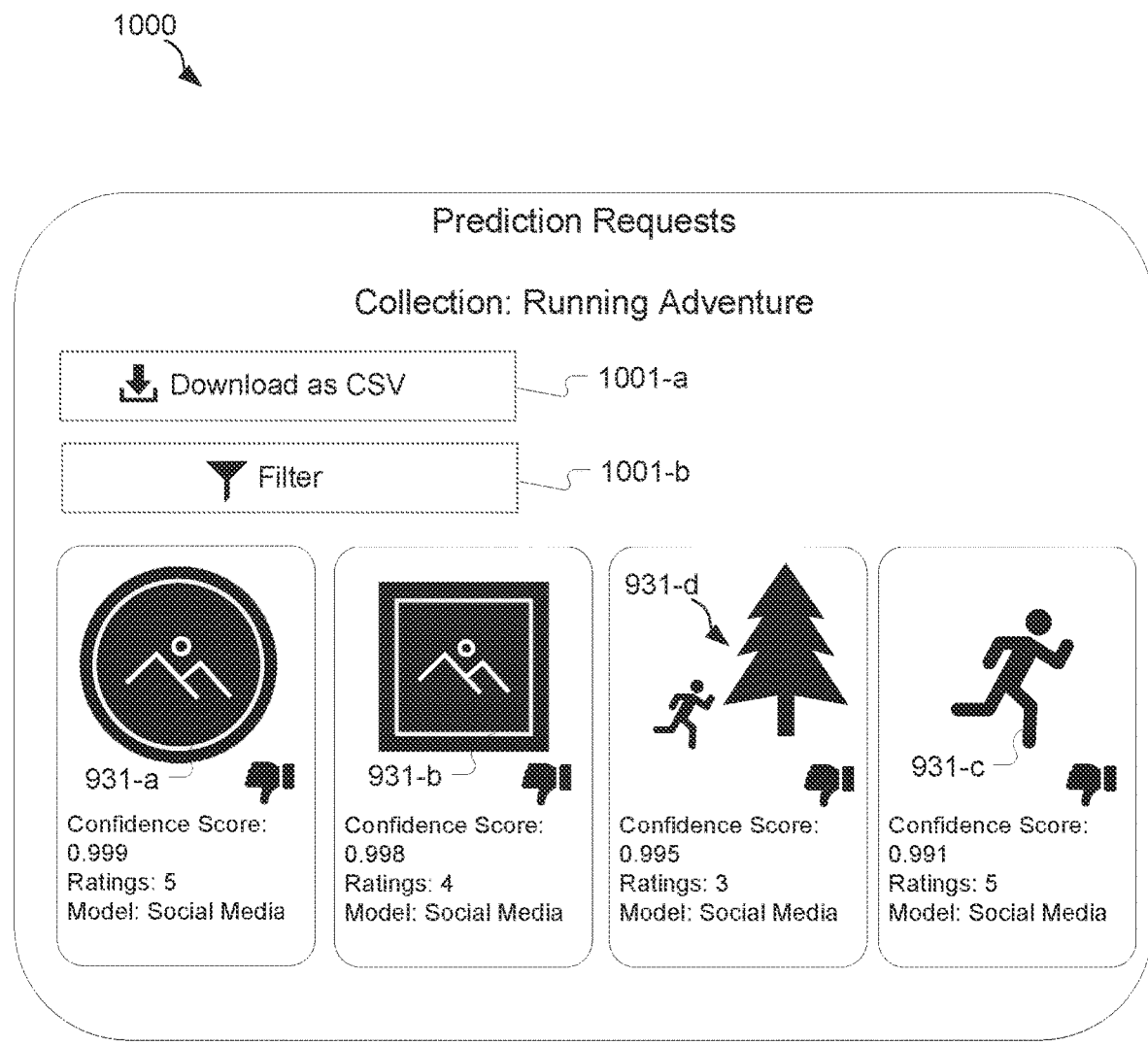
FIG. 10 illustrates an example of a user interface, in accordance with one or more implementations.
Figure 11:
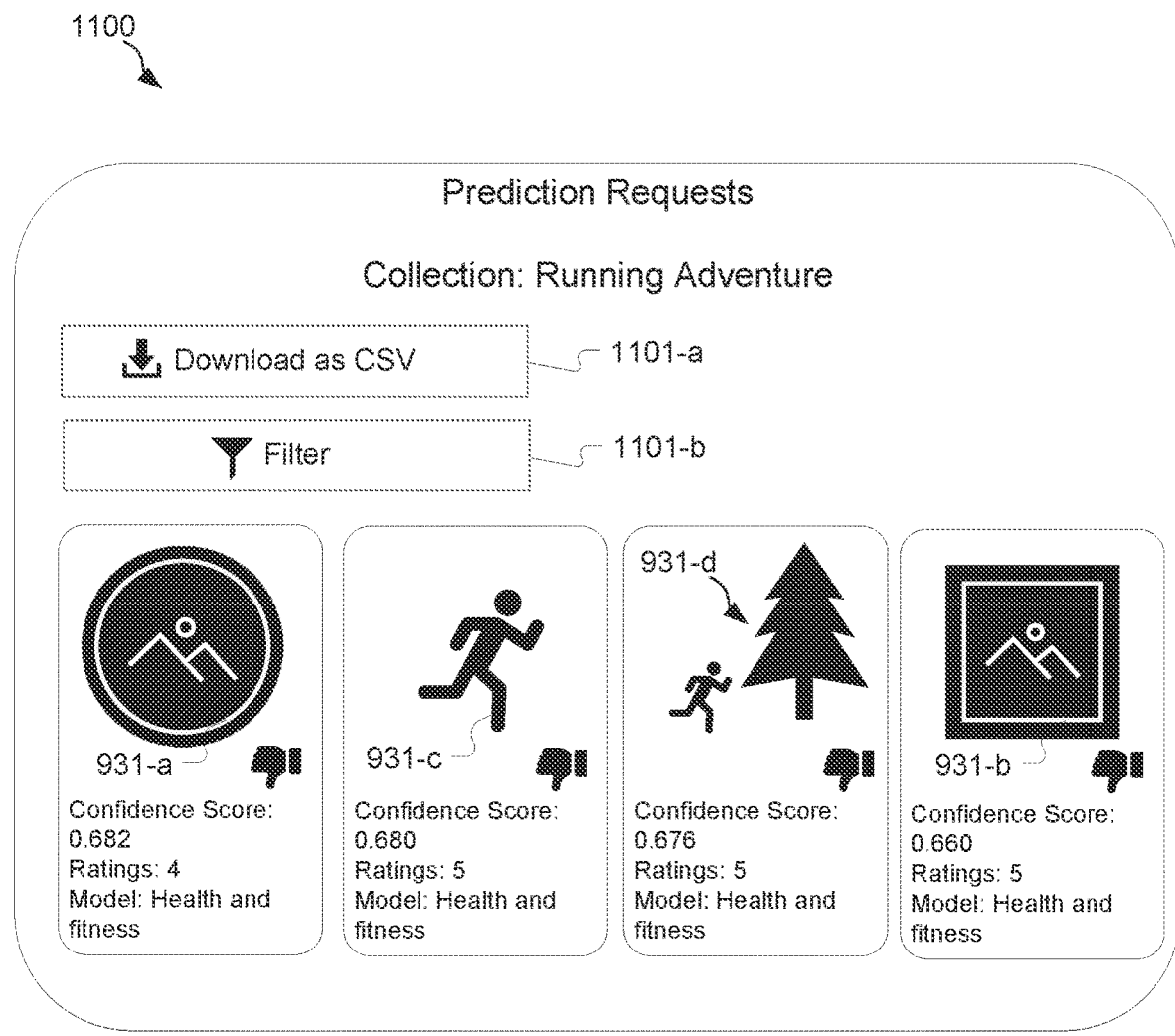
FIG. 11 illustrates an example of a user interface, in accordance with one or more implementations.

FIGS. 9-11 illustrates examples of user interfaces (UIs) 900-1100, respectively, for the system in FIG. 1, according to various embodiments of the disclosure. FIGS. 9-11 depict predicted performance results for images in an image collection/set in response to a user request.

FIG. 9 illustrates UI 900, which may be displayed on a user device, such as remote computing platform 104 in FIG. 1. As seen, UI 900 displays one or more buttons 901 (e.g., button 901-a for downloading the predicted image performance results as a Comma Separated Values or CSV file for further analysis; button 901-b for filtering the image results based on a keyword or tag) and a plurality of images 931. UI 900 also displays a confidence score and a rating in relation to each image 931 (e.g., 931-a, 931-b, 931-c, 931-d), as well as the model (e.g., Stock images) used to run the prediction. In some embodiments, a clickable icon (e.g., thumbs-down, thumbs-up, favorite) may be displayed next to each image 931 to allow the user to down-vote, up-vote, favorite, etc., a respective image. As seen, the system has predicted a rating of 4 out of 5 using the stock images model for the first image 931-a. Further, the system has computed a confidence score of 0.5803 (out of 1) for the first image 931-a. As previously described, the confidence score is a quantitative metric used to represent how confident the AI algorithm is regarding its prediction. In this example, a confidence score of 0.5803 for the first image 931-a implies that the AI algorithm is ~58% confident that humans will rate the image as a 4 out of 5 given the same context. While not necessary, in some cases, a high confidence score (e.g., >0.75, >0.90) may be indicative of a high-level of accuracy of the prediction.

In some embodiments, the system may allow a user to run different models (e.g., stock images model, social media model, a segment model, such as a health and fitness model) for the same set of images given a certain context (e.g., shoes for a running brand). In some cases, the ML models may be crafted segment by segment, and general models may be used as fallbacks, for instance, if no specific segment models are available. In some cases, a user may index the set of images related to a segment and download any relevant data as a .CSV file, for instance.

FIG. 10 illustrates an example of a UI 1000, according to various embodiments of the disclosure. UI 1000 implements one or more aspects of the figures described herein including at least UIs 900 and 1100 described in relation to FIGS. 9 and 11, respectively. In this example, the UI 1000 displays ratings and confidence scores for the plurality of images 931 (e.g., image 931-a, image 931-b, image 931-c, image 931-d) in FIG. 9, but using a second, different model (i.e., a social media model).

FIG. 11 illustrates another example of a UI 1100, according to various embodiments of the disclosure. UI 1100 implements one or more aspects of the figures described herein including at least UIs 900 and 1000 described in relation to FIGS. 9 and 10, respectively. In this example, the UI 1100 displays ratings and confidence scores for the plurality of images 931 (e.g., image 931-a, image 931-b, image 931-c, image 931-d) in FIG. 9, but using a third, different model (i.e., a health and fitness model).

Similar to FIG. 9, FIGS. 10 and 11 also display buttons 1001-a and 1001-b, and buttons 1101-a and 1101-b, respectively. As seen in FIGS. 9-11, images may be labeled (e.g., with a rating, a confidence score, etc.) differently based on the model used. For instance, image 931-a has a rating of 4 using the stock images and health and fitness models, and a rating of 5 using the social media model. Further, image 931-a has the highest confidence score for all three models. However, image 931-d has a higher rating but a lower confidence score when the stock images model is used as compared to the social media model. UIs 900-1100 also depict variations in ratings and confidence scores for the other images 931-b-d based on the different models used.

Figure 12:
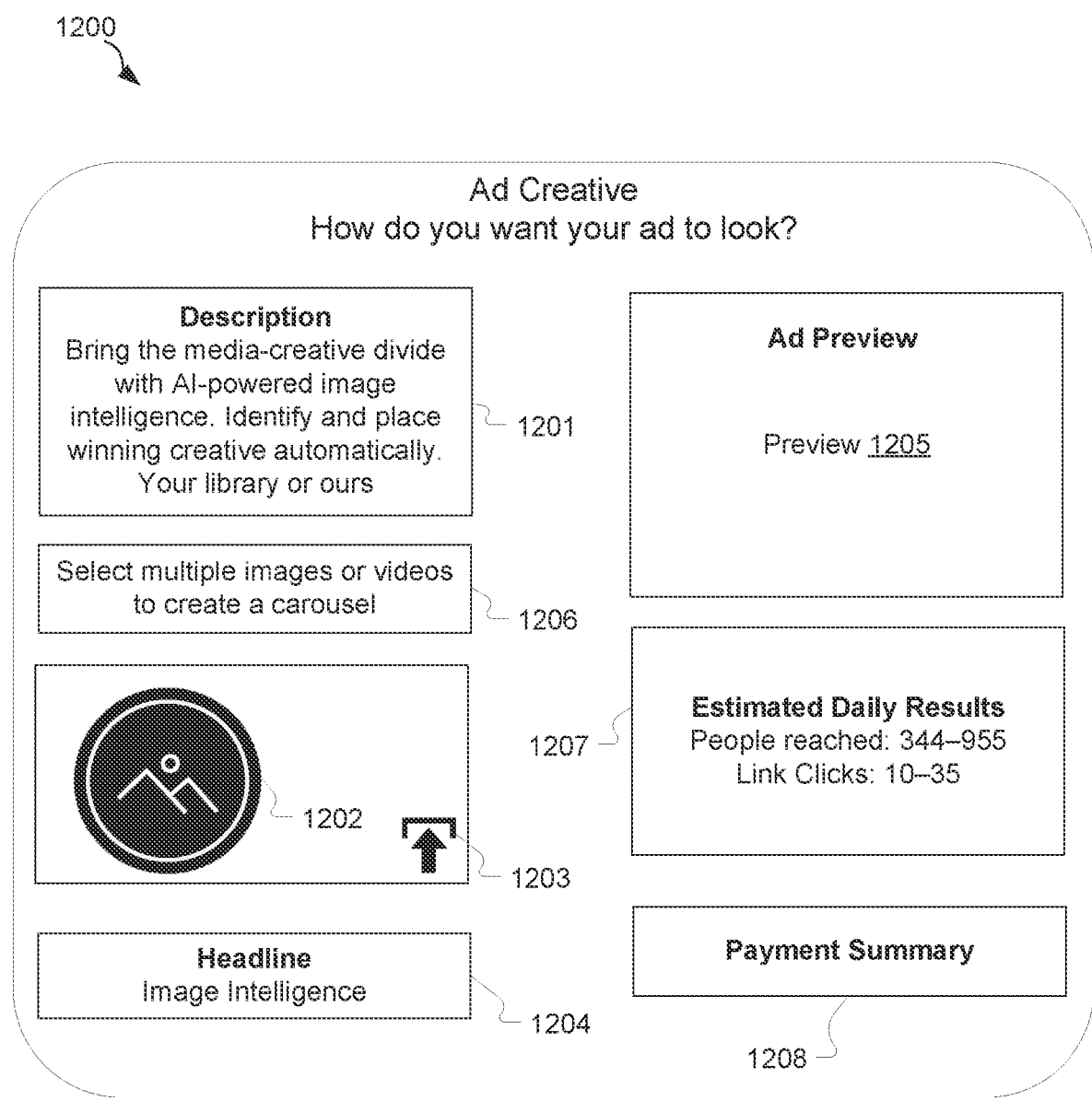
FIG. 12 illustrates an example of a user interface, in accordance with one or more implementations.

FIG. 12 illustrates an example of a UI 1200 for the system in FIG. 1, according to various embodiments of the disclosure. In some embodiments, the UI 1200 may be an example of a UI for an ad manager and may be accessed via a web interface of a user device. In some cases, the ad manager may be associated with the system 100, or any of the other systems described herein. In other cases, the ad manager may be provided by a third-party system. In some cases, a user may shortlist one or more images to use in a creative, such as an ad campaign, based on the relatedness and responsiveness labels assigned to the images by the system (e.g., system 100, system 1400). The user may then upload the one or more shortlisted images for the creative campaign using the UI 1200, further described below.

After aggregating human responsiveness and relatedness data for one or more images related to a node (e.g., people who enjoy running) in a context segment graph, a ML model may be used to classify or label candidate images in relation to the node/context. As described in relation to FIGS. 9-11, one or more ad score models may be utilized to find an optimized set of images that are predicted to enhance creative performance. In some circumstances, one or more images may rank highly in multiple models (e.g., Social Media model, Health and Fitness model, and a General Audience model), for instance, image 931-a in FIG. 9. In such cases, the user may select at least one of those images for the ad manager to use in the targeted ad campaign. In some examples, the user interface 1200 for the ad manager may comprise one or more text boxes 1201 and 1204, which may allow the user to provide a description and a headline for the ad campaign, respectively. As shown, the user interface 1200 may also comprise an upload button 1203 which may allow the user to upload an image 1202 for use in the ad campaign. In some embodiments, the ad manager user interface may also display a preview 1205 of the ad campaign, which may allow the user to make any further edits before submission. In some cases, the user interface 1200 may also display one or more statistics. For instance, "Estimated Daily Results" may relate to an estimate of predicted engagement for a creative using one of the recommended images, where the prediction may be based on the parameters in the ad and the recommended image. In some cases, the user interface 1200 may also provide payment options and/or a payment summary 1208 within the UI.

Figure 14:
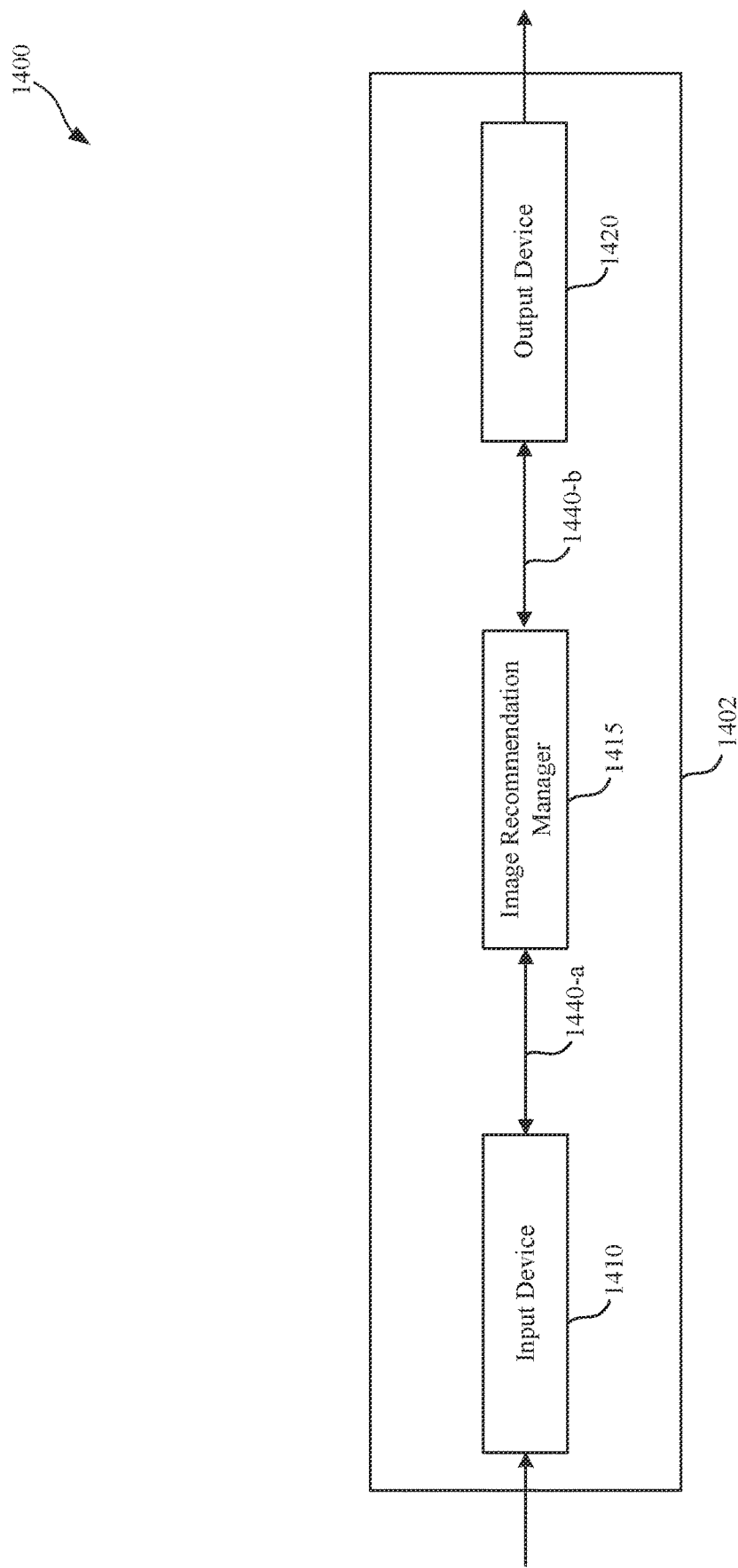
FIG. 14 shows a block diagram of a computing platform that supports subjective classification of images using human response labels for enhancing creative performance, in accordance with various aspects of the disclosure.

FIG. 14 shows a block diagram 1400 of a computing platform 1402 that supports subjective classification of images using human response labels for enhancing creative performance, according to an embodiment of the disclosure. Computing platform 1402 may be similar or substantially similar to the computing platform or server 102 previously described in relation to FIG. 1. In some examples, computing platform 1402 also implements one or more aspects of the computing platform(s) 1502, further described below in relation to FIG. 15. Computing platform 1402 may include an input device 1410, an output device 1420, and an image recommendation manager 1415. Computing platform 1402 may also include a processor (e.g., shown as processor 142 in FIG. 1). Each of these components may be in communication with one another (e.g., via one or more buses 1440, such as bus 1440-a and bus 1440-b). In some examples, computing platform or server 1402 may include components for bi-directional voice and data communications including components for transmitting and receiving communications, a memory (e.g., shown as electronic storage 140 in FIG. 1), a software (e.g., shown as machine-readable instructions 106 in FIG. 1), a transceiver, an optional antenna, and an I/O controller. Computing platform or server 1402 may communicate through wired or wireless means with one or more user devices, an image server, and/or an ad targeting server, to name a few non-limiting examples. In some implementations, computing platform 1402, user devices, image server, and/or ad targeting server may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform 1402, user devices, image server, and/or ad targeting server may be operatively linked via some other communication media Input device 1410 may receive information such as packets (e.g., images from one or more image sources, such as image server 317 in FIG. 3; a context segment graph, etc.), user response data (e.g., from one or more user devices or remote computing platforms, such as remote computing platforms 104), or any other relevant information. In some cases, information received by the input device 1410 may be passed on to other components of the computing platform. In some examples, the input device 1410 may be an example of a transceiver.

Image recommendation manager 1415 may implement one or more aspects of the image ranking component manager 1515 described with reference to FIG. 15. Additionally, or alternatively, the image recommendation manager 1415 may implement one or more aspects of the modules previously described in relation to FIGS. 1 and/or 3.

Image recommendation manager 1415 and/or at least some of its various sub-components may be implemented in hardware, software executed by a processor, firmware, or any combination thereof. If implemented in software executed by a processor, the functions of the image recommendation manager 1415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. In some cases, the image recommendation manager 1415 and/or at least some of its various sub-components may be physically located at various positions, including being distributed such that portions of functions are implemented at different physical locations by one or more physical devices. In some examples, image recommendation manager 1415 and/or at least some of its various sub-components may be a separate and distinct component in accordance with various aspects of the present disclosure. In other examples, image recommendation manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Image recommendation manager 1415 may receive a set of images from one or more sources. Image ranking component manager 1415 may access a context segment graph comprising one or more nodes, each node associated with at least one segment, wherein the at least one segment is selected from a group consisting of an interest, a business segment, or an audience segment. While not necessary, in some cases, the context segment graph (e.g., context segment graph 1600 in FIG. 16) may be accessed from an ad targeting system or server. In some cases, the ad targeting system may be linked with the AI engine 302 in FIG. 3. In some embodiments, the image recommendation manager 1415 may identify, from the set of images, a subset of images related to a node in the context segment graph. Further, the image recommendation manager 1415 may receive user responses for the subset of images, wherein the user responses are in context to the node in the context segment graph. In some cases, the user responses are received from at least one user, and each user response includes a relatedness value and a responsiveness value for an image from the subset of images in context to the node. In some examples, the image ranking component manager 1415 may generate one or more models for predicting image performance based on the user responses, further described in relation to FIGS. 1, 8, and/or 16. Image recommendation manager 1415 may further receive a plurality of candidate images for a creative campaign. In some embodiments, image recommendation manager 1415 may determine, using at least one model of the one or more models, a first set of metrics for each candidate image of the plurality of candidate images in context to the node. The first set of metrics for each candidate image includes at least a confidence score and one or more of a relatedness value and a responsiveness value in context to the node. In some cases, the image ranking component manager 1415 may display a listing of the plurality of candidate images, wherein the listing comprises the first set of metrics for each of the plurality of candidate images, further described in relation to FIGS. 5-11.

Output device 1420 may transmit signals generated by other components of the device or computing platform 1402. In some examples, the output device 1420 may be collocated with the input device 1410 in a transceiver module. For example, the output device 1420 may include aspects of the transceiver (e.g., network interface 1320 in FIG. 13). The output device 1420 may include a single antenna, or it may include a set of antennas to communicate over a network (e.g., network 1330 in FIG. 13). In other cases, the output device 1420 may implement wired technology (e.g., ethernet).

Figure 15:
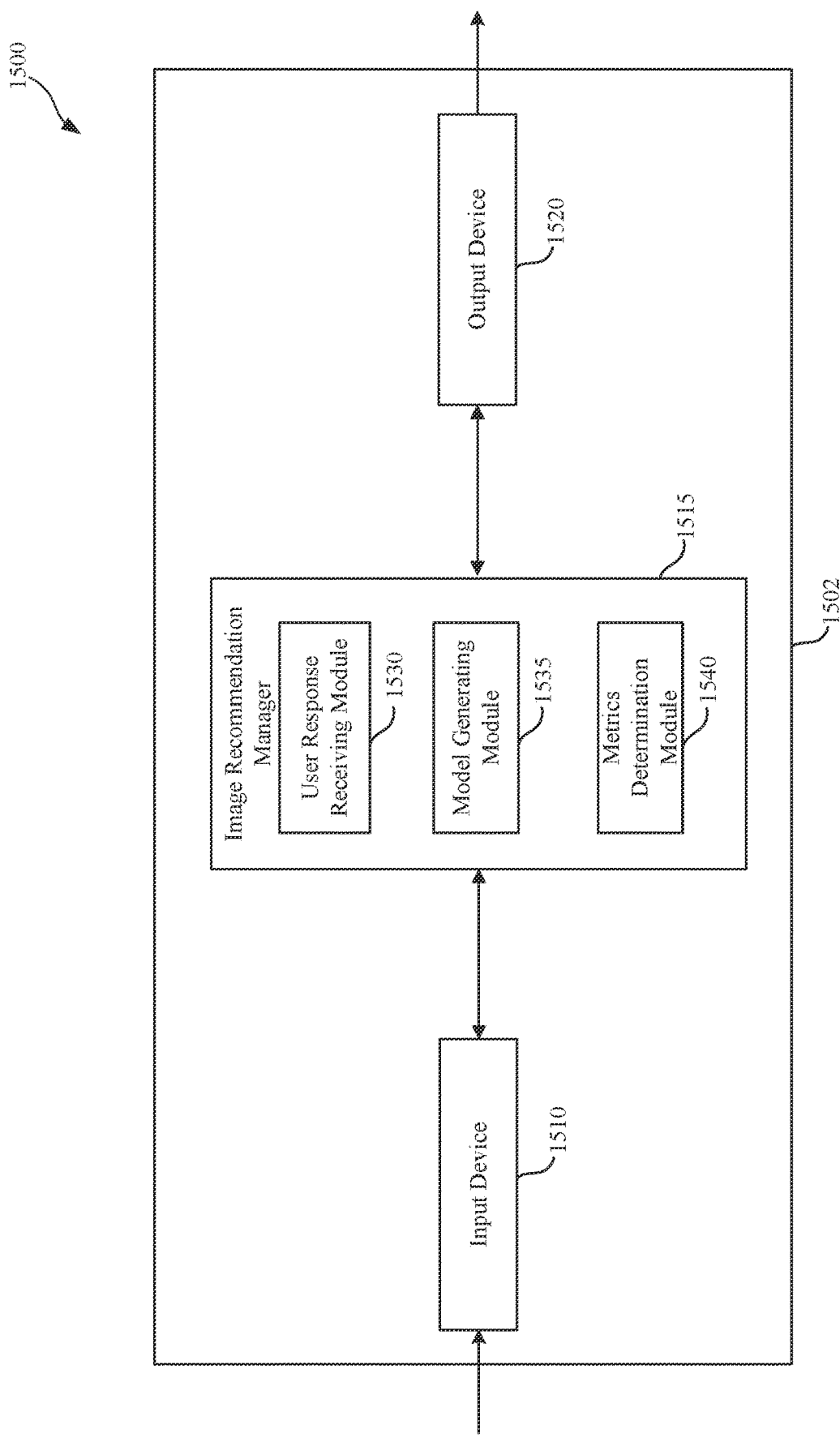
FIG. 15 shows a block diagram of a computing platform that supports subjective classification of images using human response labels for enhancing creative performance, in accordance with various aspects of the disclosure.

FIG. 15 shows a block diagram 1500 of a computing platform 1502 that supports subjective classification of images using human response labels for enhancing creative performance, according to an embodiment of the disclosure. Computing platform 1502 may be similar or substantially similar to the computing platform or server 102 previously described in relation to FIG. 1. In some examples, computing platform 1502 also implements one or more aspects of the computing platform(s) 1402 described in relation to FIG. 14. Computing platform 1502 may include an input device 1510, an output device 1520, and an image recommendation manager 1515. Computing platform 1502 may also include a processor. Each of these components may be in communication with one another (e.g., via one or more buses). Image recommendation manager 1515 may be similar or substantially similar to the image recommendation manager 1415 previously described in relation to FIG. 14.

Input device 1510 may receive information such as packets (e.g., images from one or more image sources, a context segment graph, etc.), user response data (e.g., from one or more user devices or remote computing platforms, such as remote computing platform(s) 104), or any other relevant information. In some cases, information received by the input device 1510 may be passed on to other components of the computing platform. The input device 1510 may be an example of a transceiver.

As seen, the image recommendation manager 1515 comprises one or more modules, including a context segment graph module 1530, a model generating module 1535, and a metrics determination module 1540.

In some cases, the computing platform 1502 may access a context segment graph including one or more nodes, where each node may be associated with at least one segment. By way of non-limiting example, the at least one segment may be selected from a group consisting of an interest, a business segment, or an audience segment. Additionally, or alternatively, in some examples, the context segment graph may be associated with one or more segment categories, including, but not limited to, fashion, fitness, food, business, creative, real estate, beauty, medical, consumer goods, travel, outdoors, home services, etc. Other segment categories known in the art are contemplated in different embodiments and the examples listed herein are not intended to be limiting.

Further, the computing platform 1502 may receive a set of images from one or more image sources. In some embodiments, the set of images may be received from one or more image servers, such as image server 317 in FIG. 3. Remote computing platform 104 may be one non-limiting example of an image server. In some cases, the set of images may be received at the input device 1510.

In some cases, the image recommendation manager 1515 identifies, from the set of images, a subset of images (e.g., subset of images 1616) related to a node (e.g., node 1610-*a*) in the context segment graph (e.g., context segment 1600 in FIG. 16). Further, user response receiving module 1530 may receive one or more user responses for the subset of images. The one or more user responses may be in context to the node in the context segment graph. Further, the one or more user responses may be received from at least one user. In some examples, each user response may include a relatedness value and a responsiveness value for an image from the subset of images in context to the node. In some cases, the user responses may be received from at least one user device (e.g., remote computing platform 104) associated with the at least one user. The user responses may be received at the input device 1510, for instance.

In some cases, the image recommendation manager 1515 may aggregate human responsiveness data to the image subset (e.g., subset of images 1616) in context to (or given) the selected node 1610-*a* in the context segment graph 1600. As described above, audience members (e.g., social media users, e-commerce or online shopping users, general internet users, etc.) may be asked for their feedback on an image (or subset of images) given a context. Further, their feedback may be input into a machine learning (ML) model generated by an artificial intelligence (AI) algorithm. Utilizing feedback from a larger number of users may allow the AI algorithm to gain some level of scale out of the input data. In other words, feedback received from a large number of audience members may serve to ensure that the images used in an ad campaign are an adequate representation of them as a whole, as well as different subgroups within them. In some cases, the user responses may include relatedness and responsiveness values for images with respect to a node. In some cases, each user response may be defined in two parts or scoring portions, where a second scoring portion may be conditional to the first scoring portion. For instance, the first scoring portion may comprise a binary sample of human expectation of node relatedness (e.g., a yes or no, a 1 or 0, True or false, related or unrelated, good or bad, to name a few non-limiting examples) of images from the image set (e.g., images 1615 and subset of images 1616) as to their relatedness to the node (e.g., node 1610-a). In some cases, the responses may be collected from random audience members. In other cases, the responses may be collected from audience members falling into a particular segment or audience cohort (e.g., having a particular interest). Next, for the second scoring portion, only images (e.g., subset of images 1616) deemed to be related to the node may be graded on a scale (e.g., between 0% and 100%, between 1 and 10, between 0 and 5, between 1 and 5, etc.). In some cases, the second scoring portion may relate to a responsiveness (or response likelihood), where the responsiveness is rated on said scale. It should be noted that, the image recommendation manager 1515 may collect user responses for multiple nodes and/or segments in the context segment graph 1600. For instance, after collecting user responses in context to node 1610-a, the image ranking component manager 1515 may also collect user responses in context to the nodes 1610-b, 1610-c, etc. The user responses for nodes 1610-b and/or 1610-c may be collected from the same users or different users. In one non-limiting example, the user responses for nodes 1610-a, 1610-b, and 1610-c may be collected from different sets or segments of audience members (e.g., segment 1605-a, segment 1605-b, and segment 1605-c). In another non-limiting example, the user responses for nodes 1610-a, 1610-b, and 1610-c may be collected from the same set of users or audience members, or alternatively, a randomized set of users or audience members. In either way, audience members or users may be asked for their feedback on images 1615 in context to the selected node 1610.

The user responses (e.g., relatedness and responsiveness of images to the node(s)) may be used to generate one or more models, such as an ad score model. In some examples, different types of ad score models may be utilized based on the target audience, audience group, focus group, etc. For instance, a social media model may be used to predict how an image may fare (e.g., with regards to user engagement) when displayed to an average social media user. A high-level of user engagement (e.g., a user clicking on a digital advertisement or hyperlink associated with the image) may correlate to increased ad revenue, promotion, etc. for a brand or company. In some cases, user engagement with an image is not only subjective, i.e., since it is based on the user's tastes and preferences, but also context dependent. While two images, e.g., an image of a dolphin leaping out of the water and an image of a couple walking along the beach, may have aesthetic qualities, the first image may be a poor choice given the context "Summer apparel brand" and the second image may be a poor choice given the context "Dolphin/Whale Watching". Aspects of this disclosure relate to subjective classification of images by a classifier or machine-learning algorithm, where the subjective classification is based on human survey data collected for images from a training dataset given a context. Said another way, given an image or set of images, what would a person (e.g., general audience, social media user, particular interests user, etc.) think of said image (or set of images) in a given context.

As described below, the computing platform 1502 may classify and rank images (e.g., candidate images) from a wide variety of image sources (e.g., social media, websites, image group boards or forums, stock image sites, etc.) based on their predicted performance with the different audience or focus groups. It should be noted that, the candidate images may be different than the training dataset images used to generate the one or more scoring models.

In some examples, model generating module 1535 may generate one or more models for predicting ad performance. Generating the one or more models for predicting image performance may include training a machine learning or another artificial intelligence algorithm to label a relatedness value and a responsiveness value for at least one future candidate image given a context segment node. As used herein, the term "context segment node" may refer to a node in a context segment graph that is further associated with a context. For instance, a context segment graph may comprise a plurality of nodes and a plurality of segments, where each node is associated with at least one segment. In one non-limiting example, a context segment graph may comprise a "Fashion" segment, a "Fitness" segment, and a "Food" segment. Further, a node related to "Running" may be associated with each of those three segments. In one non-limiting example, a context segment node may comprise the "Running" node given the context "Sports apparel brand". In another non-limiting example, a context segment node may comprise the "Running" node given the context "Gym" or "Treadmill brand". In some cases, the one or more models for predicting image performance may assign different relatedness and responsiveness labels for candidate images for different context segment nodes, even though the context segment nodes may be associated with a common node, such as "Running".

Metrics determination module 1540 may determine using at least one model of the one or more models, a relatedness value, and optionally, a responsiveness value for at least a portion of the candidate images. In some embodiments, the metrics determination module 1540 may only determine a responsiveness value for a candidate image when the relatedness value for the candidate image meets a certain criterion. For instance, a responsiveness value for a candidate image may only be determined when the candidate image is related to the node. In other words, the metrics determination module 1540 determines responsiveness value(s) for candidate image(s) that have a positive relatedness value (e.g., are assigned a relatedness value of '1' or 'True' or 'Related'.)

Output device 1520 may transmit signals generated by other components of the device or computing platform 1502. In some examples, the output device 1520 may be collocated with the input device 1510 in a transceiver module. The output device 1520 may include a single antenna, or it may include a set of antennas. In other cases, the output device 1520 may implement wired technology (e.g., ethernet).

Processor, shown as processor 142 in FIG. 1, may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions (e.g., functions or tasks supporting image ranking). Memory, shown as electronic storage 140 in FIG. 1, may include random access memory (RAM) and read only memory (ROM). The memory may store computer-readable, computer-executable software including instructions that, when executed, cause the processor to perform various functions described herein. In some cases, the memory may contain, among other things, a basic input/output system (BIOS) which may control basic hardware and/or software operation such as the interaction with peripheral components or devices.

Software may include code to implement aspects of the present disclosure, including code to support subjective classification of images using human response labels. Software may be stored in a non-transitory computer-readable medium such as system memory or other memory. In some cases, the software may not be directly executable by the processor but may cause a computer (e.g., when compiled and executed) to perform functions described herein.

Figure 13:
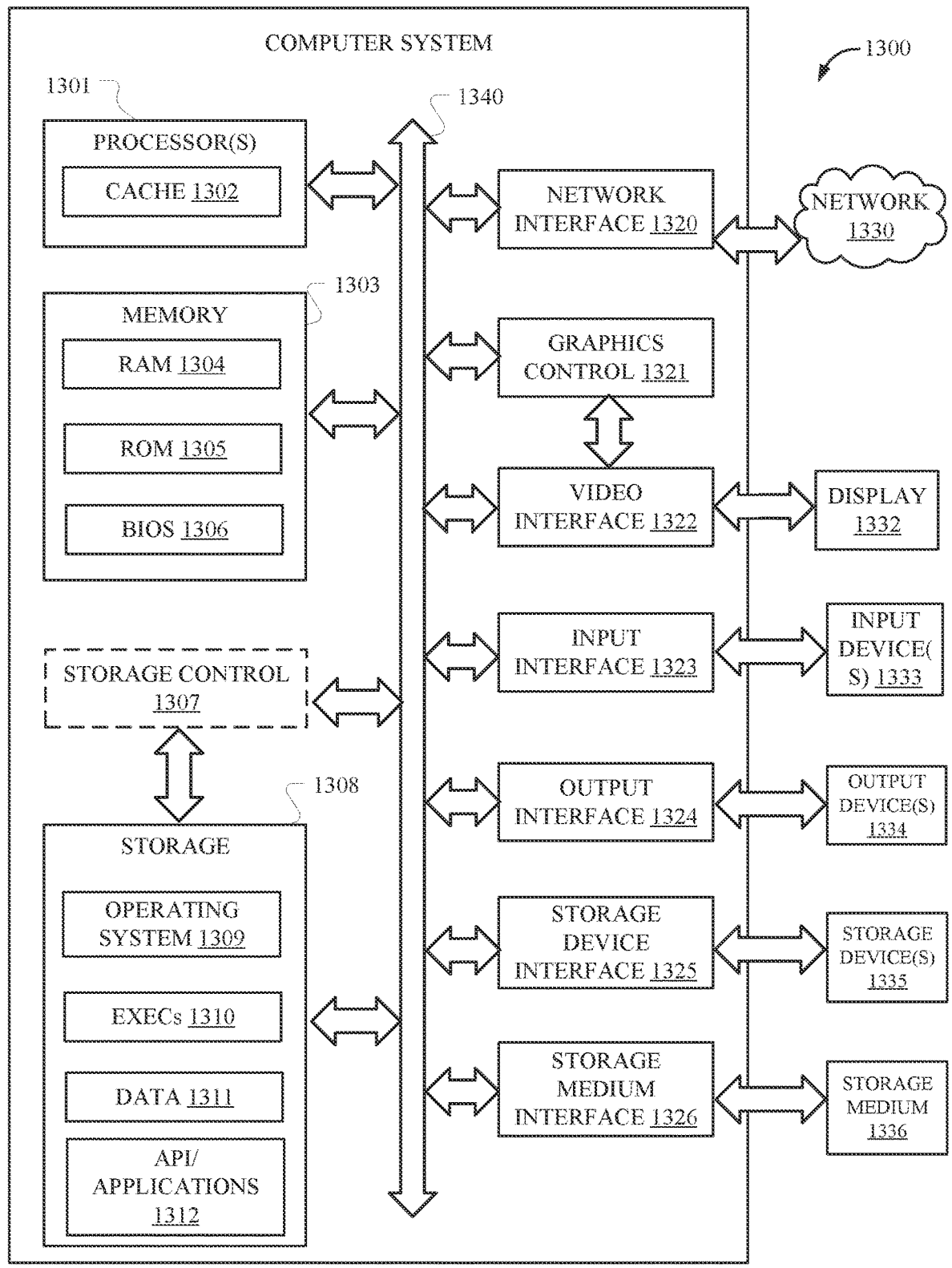
FIG. 13 is a block diagram illustrating a computer system according to various embodiments of the disclosure.

Transceiver, shown as network interface 1320 in FIG. 13, may communicate bi-directionally, via one or more antennas, wired, or wireless links. For example, the transceiver may represent a wireless transceiver and may communicate bi-directionally with another wireless transceiver. The transceiver may also include a modem to modulate the packets and provide the modulated packets to the antennas for transmission, and to demodulate packets received from the antennas.

I/O controller, shown as input interface 1323 and output interface 1324 in FIG. 13, may manage input and output signals for computing platform 1502. I/O controller may also manage peripherals not integrated into computing platform 1502. In some cases, I/O controller may represent a physical connection or port to an external peripheral. In some cases, the I/O controller may utilize an operating system such as iOS®, ANDROID®, MS-DOS®, MS-WINDOWS®, OS/2®, UNIX®, LINUX®, or another known operating system. In other cases, I/O controller may represent or interact with a modem, a keyboard, a mouse, a touchscreen, or a similar device. In some cases, I/O controller may be implemented as part of a processor. In some cases, a user may interact with computing platform 1502 via I/O controller or via hardware components controlled by I/O controller, such as input device 1510.

FIG. 13 illustrates a diagrammatic representation of one embodiment of a computer system 1300, within which a set of instructions can execute for causing a device to perform or execute any one or more of the aspects and/or methodologies of the present disclosure. The components in FIG. 13 are examples only and do not limit the scope of use or functionality of any hardware, software, firmware, embedded logic component, or a combination of two or more such components implementing particular embodiments of this disclosure. Some or all of the illustrated components can be part of the computer system 1300. For instance, the computer system 1300 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 1300 includes at least a processor 1301 such as a central processing unit (CPU) or a graphics processing unit (GPU) to name two non-limiting examples. Any of the subsystems described throughout this disclosure could embody the processor 1301. The computer system 1300 may also comprise a memory 1303 and a storage 1308, both communicating with each other, and with other components, via a bus 1340. The bus 1340 may also link a display 1332, one or more input devices 1333 (which may, for example, include a keypad, a keyboard, a mouse, a stylus, etc.), one or more output devices 1334, one or more storage devices 1335, and various non-transitory, tangible computer-readable storage media 1336 with each other and/or with one or more of the processor 1301, the memory 1303, and the storage 1308. All of these elements may interface directly or via one or more interfaces or adaptors to the bus 1340. For instance, the various non-transitory, tangible computer-readable storage media 1336 can interface with the bus 1340 via storage medium interface 1326. Computer system 1300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1301 (or central processing unit(s) (CPU(s))) optionally contains a cache memory unit 1332 for temporary local storage of instructions, data, or computer addresses. Processor(s) 1301 are configured to assist in execution of computer-readable instructions stored on at least one non-transitory, tangible computer-readable storage medium. Computer system 1300 may provide functionality as a result of the processor(s) 1301 executing software embodied in one or more non-transitory, tangible computer-readable storage media, such as memory 1303, storage 1308, storage devices 1335, and/or storage medium 1336 (e.g., read only memory (ROM)). Memory 1303 may read the software from one or more other non-transitory, tangible computer-readable storage media (such as mass storage device(s) 1335, 1336) or from one or more other sources through a suitable interface, such as network interface 1320. Any of the subsystems herein disclosed could include a network interface such as the network interface 1320. The software may cause processor(s) 1301 to carry out one or more processes or one or more steps of one or more processes described or illustrated herein. Carrying out such processes or steps may include defining data structures stored in memory 1303 and modifying the data structures as directed by the software. In some embodiments, an FPGA can store instructions for carrying out functionality as described in this disclosure. In other embodiments, firmware includes instructions for carrying out functionality as described in this disclosure.

The memory 1303 may include various components (e.g., non-transitory, tangible computer-readable storage media) including, but not limited to, a random-access memory component (e.g., RAM 1304) (e.g., a static RAM "SRAM", a dynamic RAM "DRAM, etc.), a read-only component (e.g., ROM 1305), and any combinations thereof. ROM 1305 may act to communicate data and instructions unidirectionally to processor(s) 1301, and RAM 1304 may act to communicate data and instructions bidirectionally with processor(s) 1301. ROM 1305 and RAM 1304 may include any suitable non-transitory, tangible computer-readable storage media. In some instances, ROM 1305 and RAM 1304 include non-transitory, tangible computer-readable storage media for carrying out a method. In one example, a basic input/output system 1306 (BIOS), including basic routines that help to transfer information between elements within computer system 1300, such as during start-up, may be stored in the memory 1303.

Fixed storage 1308 is connected bi-directionally to processor(s) 1301, optionally through storage control unit 1307. Fixed storage 1308 provides additional data storage capacity and may also include any suitable non-transitory, tangible computer-readable media described herein. Storage 1308 may be used to store operating system 1309, EXECs 1310 (executables), data 1311, API applications 1312 (application programs), and the like. Often, although not always, storage 1308 is a secondary storage medium (such as a hard disk) that is slower than primary storage (e.g., memory 1303). Storage 1308 can also include an optical disk drive, a solid-state memory device (e.g., flash-based systems), or a combination of any of the above. Information in storage 1308 may, in appropriate cases, be incorporated as virtual memory in memory 1303.

In one example, storage device(s) 1335 may be removably interfaced with computer system 1300 (e.g., via an external port connector (not shown)) via a storage device interface 1325. Particularly, storage device(s) 1335 and an associated machine-readable medium may provide nonvolatile and/or volatile storage of machine-readable instructions, data structures, program modules, and/or other data for the computer system 1300. In one example, software may reside, completely or partially, within a machine-readable medium on storage device(s) 1335. In another example, software may reside, completely or partially, within processor(s) 1301.

Bus 1340 connects a wide variety of subsystems. Herein, reference to a bus may encompass one or more digital signal lines serving a common function, where appropriate. Bus 1340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1300 may also include an input device 1333. In one example, a user of computer system 1300 may enter commands and/or other information into computer system 1300 via input device(s) 1333. Examples of an input device(s) 1333 include, but are not limited to, an alpha-numeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 1333 may be interfaced to bus 1340 via any of a variety of input interfaces 1323 (e.g., input interface 1323) including, but not limited to, serial, parallel, game port, USB, FIREWIRE, THUNDERBOLT, or any combination of the above.

In particular embodiments, when computer system 1300 is connected to network 1330, computer system 1300 may communicate with other devices, such as mobile devices and enterprise systems, connected to network 1330. Communications to and from computer system 1300 may be sent through network interface 1320. For example, network interface 1320 may receive incoming communications (such as requests or responses from other devices) in the form of one or more packets (such as Internet Protocol (IP) packets) from network 1330, and computer system 1300 may store the incoming communications in memory 1303 for processing. Computer system 1300 may similarly store outgoing communications (such as requests or responses to other devices) in the form of one or more packets in memory 1303 and communicated to network 1330 from network interface 1320. Processor(s) 1301 may access these communication packets stored in memory 1303 for processing.

Examples of the network interface 1320 include, but are not limited to, a network interface card, a modem, and any combination thereof. Examples of a network 1330 or network segment 1330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1330, may employ a wired and/or a wireless mode of communication. In general, any network topology may be used.

Information and data can be displayed through a display 1332. Examples of a display 1332 include, but are not limited to, a liquid crystal display (LCD), an organic liquid crystal display (OLED), a cathode ray tube (CRT), a plasma display, and any combinations thereof. The display 1332 can interface to the processor(s) 1301, memory 1303, and fixed storage 1308, as well as other devices, such as input device(s) 1333, via the bus 1340. The display 1332 is linked to the bus 1340 via a video interface 1322, and transport of data between the display 1332 and the bus 1340 can be controlled via the graphics control 1321.

In addition to a display 1332, computer system 1300 may include one or more other peripheral output devices 1334 including, but not limited to, an audio speaker, a printer, a check or receipt printer, and any combinations thereof. Such peripheral output devices may be connected to the bus 1340 via an output interface 1324. Examples of an output interface 1324 include, but are not limited to, a serial port, a parallel connection, a USB port, a FIREWIRE port, a THUNDERBOLT port, and any combinations thereof.

In addition, or as an alternative, computer system 1300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these.

A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1300 shown in FIG. 13 such as, but not limited to, the network 1330, processor 1301, memory, 1303, etc., may comprise a cloud computing system. In one such system, front-end systems such as input devices 1333 may provide information to back-end platforms such as servers (e.g. computer systems 1300) and storage (e.g., memory 1303). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing image recommendations, the system comprising:
one or more hardware processors configured by machine-readable instructions to:
receive a set of images from one or more image sources;
access a context segment graph comprising one or more nodes, each node associated with a segment, wherein the segment is selected from a group consisting of an interest, a business segment, or an audience segment;
identify, from the set of images, a subset of images related to a node in the context segment graph;
receive, from at least one user, user responses for the subset of images, wherein each user response includes a relatedness value and a responsiveness value for an image from the subset of images in context to the node;
aggregate user response data based on receiving the user responses for the subset of images in context to the nodes in the context segment graph;
generate a training dataset comprising at least the subset of images, information pertaining to the nodes in the context segment graph, and the aggregated user response data;
training a one or more machine learning models for predicting image performance based in part on the user responses, wherein training the one or more machine learning models comprises training a machine learning algorithm using the training dataset to label a relatedness value and a responsiveness value for multiple candidate images in context to the node in the context segment graph;
receive multiple candidate images for a creative campaign;
determine, using at least one machine learning model of the one or more machine learning models, a first set of metrics for each candidate image of the candidate images in context to the node, wherein the first set of metrics for each candidate image includes at least a confidence score and one or more of a relatedness value and a responsiveness value in context to the node;
display, in a graphic user interface for a user approval, an advertisement campaign including a listing of the candidate images comprising the first set of metrics for each of the candidate images;
receive advertisement performance data for a plurality of advertisements, wherein each advertisement of the plurality of advertisements displays an image from the subset of images;
determine, for each image displayed in an advertisement, an aggregate score, wherein the aggregate score is based at least in part on the relatedness values and responsiveness values for the image received via the user responses;

compare, for each image displayed in an advertisement, a respective aggregate score and respective advertisement performance data; and validate the one or more machine learning models for predicting image performance based in part on comparing the respective aggregate scores and advertisement performance data.

2. The system of claim 1, wherein each user response is defined using a first scoring portion and a second scoring portion, the second scoring portion conditional on the first scoring portion.

3. The system of claim 2, wherein receiving the user responses comprises receiving a first scoring portion for each user response, each first scoring portion comprising a binary sample of user expectation of relatedness of a respective image of the subset of images in context to the nodes in the context segment graph, the binary sample of user expectation of relatedness selected from one of yes or no, 1 or 0, or true or false.

4. The system of claim 3, wherein the one or more hardware processors are further configured by machine-readable instructions to:

identify, for at least one image of the subset of images, a respective first scoring portion for at least one user response comprising one of, yes, 1, or true; and receive a second scoring portion for each user response of the at least one user response, each second scoring portion comprising a numerical value for a respective image of the subset of images, wherein each numerical value is rated on a scale between a lower bound and an upper bound, and wherein each numerical value is associated with a responsiveness to the nodes.

5. The system of claim 4, wherein the first scoring portion comprises the relatedness value and the second scoring portion comprises the responsiveness value.

6. The system of claim 1, wherein the one or more hardware processors are further configured by machine-readable instructions to:

define, for at least one node in the context segment graph, including the node, a tag cloud or term group.

7. The system of claim 1, wherein a context segment graph is associated with a segment category, the segment category selected from a group consisting of fashion, fitness, food, business, creative, real estate, beauty, medical, consumer goods, travel, outdoors, and home services.

8. The system of claim 1, wherein the one or more machine learning models comprise one or more of a general audience model, a social media model, a stock images model, an interests model, an audience segment or audience cohort model, a context model, and a segment model.

9. The system of claim 1, wherein training the one or more machine learning models for predicting image performance comprises:

identifying one or more attributes for each image from the subset of images, wherein the one or more attributes include one or more of pixel related information, stylistic information, an image vector, keyword metadata or tags, and human labels;

grouping the subset of images into a number of groups based on relatedness and responsiveness values from the user responses; and determining an average of attributes for each group based at least in part on the one or more attributes for each image in the group.

10. The system of claim 9, wherein determining the first set of metrics for each of the candidate images comprises:

determining one or more attributes for each candidate image;

determining a similarity vector for each candidate image by comparing the one or more attributes for each candidate image with respect to the average of attributes for each group; and assigning a plurality of labels to each candidate image based at least in part on the similarity vector, wherein the plurality of labels include a confidence score, a relatedness value, and a responsiveness value for a candidate image in context to the nodes.

11. A method for providing image recommendations, the method comprising:

receiving a set of images from one or more image sources;

accessing a context segment graph comprising one or more nodes, each node associated with a segment, wherein the segment is selected from a group consisting of an interest, a business segment, or an audience segment;

identifying, from the set of images, a subset of images related to a node in the context segment graph;

receiving, from at least one user, user responses for the subset of images, wherein each user response includes a relatedness value and a responsiveness value for an image from the subset of images in context to the node;

aggregating user response data based on receiving the user responses for the subset of images in context to the nodes in the context segment graph;

generating a training dataset comprising at least the subset of images, information pertaining to the nodes in the context segment graph, and the aggregated user response data;

training one or more machine learning models for predicting image performance based in part on the user responses, wherein training the one or more models comprises training a machine learning algorithm using the generated training dataset to label a relatedness value and a responsiveness value for the plurality of candidate images in context to the node in the context segment graph;

receiving a plurality of candidate images for a creative campaign;

determining, using at least one machine learning model of the one or more machine learning models, a first set of metrics for each candidate image of the plurality of candidate images in context to the node, wherein the first set of metrics for each candidate image includes at least a confidence score and one or more of a relatedness value and a responsiveness value in context to the node;

displaying, in a graphic user interface for a user approval, an advertisement campaign including a listing of the plurality of candidate images comprising the first set of metrics for each of the candidate images;

receiving advertisement performance data for a plurality of advertisements, wherein each advertisement of the plurality of advertisements displays an image from the subset of images;

determining, for each image displayed in an advertisement, an aggregate score, wherein the aggregate score is based at least in part on the relatedness values and responsiveness values for the image received via the user responses;

comparing, for each image displayed in an advertisement, a respective aggregate score and respective advertisement performance data; and validating the one or more machine learning models for predicting image performance based in part on comparing the respective aggregate scores and advertisement performance data.

12. The method of claim 11, wherein each user response is defined using a first scoring portion and a second scoring portion, the second scoring portion conditional on the first scoring portion, and wherein receiving the user responses comprises receiving a first scoring portion for each user response, each first scoring portion comprising a binary sample of user expectation of relatedness of a respective image of the subset of images in context to the nodes in the context segment graph, the binary sample of user expectation of relatedness selected from one of yes or no, 1 or 0, or true or false.

13. The method of claim 12, further comprising:
identifying, for at least one image of the subset of images, a respective first scoring portion for at least one user response comprising one of, yes, 1, or true; and
receiving a second scoring portion for each user response of the at least one user response, each second scoring portion comprising a numerical value for a respective image of the subset of images, wherein each numerical value is rated on a scale between a lower bound and an upper bound, and wherein each numerical value is associated with a responsiveness to the nodes, and wherein the first scoring portion comprises the relatedness value and the second scoring portion comprises the responsiveness value.

14. The method of claim 11, wherein training the one or more machine learning models for predicting image performance comprises:
identifying one or more attributes for each image from the subset of images, wherein the one or more attributes include one or more of pixel related information, stylistic information, an image vector, keyword metadata or tags, and human labels;
grouping the subset of images into a number of groups based on relatedness and responsiveness values from the user responses; and
determining an average of attributes for each group based at least in part on the one or more attributes for each image in the group.

15. The method of claim 14, wherein determining the first set of metrics for each of the candidate images comprises:
determining one or more attributes for each candidate image;
determining a similarity vector for each candidate image by comparing the one or more attributes for each candidate image with respect to the average of attributes for each group; and
assigning a plurality of labels to each candidate image based at least in part on the similarity vector, wherein the plurality of labels include a confidence score, a relatedness value, and a responsiveness value for a candidate image in context to the nodes.

16. A non-transient computer-readable storage medium having instructions embodied thereon, and being executable by one or more processors to perform a method for providing image recommendations, the method comprising:
receiving a set of images from one or more image sources;
accessing a context segment graph comprising one or more nodes, each node associated with a segment, wherein the segment is selected from a group consisting of an interest, a business segment, or an audience segment;
identifying, from the set of images, a subset of images related to a node in the context segment graph;
receiving, from at least one user, user responses for the subset of images, wherein each user response includes a relatedness value and a responsiveness value for an image from the subset of images in context to the node;
aggregating user response data based on receiving the user responses for the subset of images in context to the nodes in the context segment graph;
generating a training dataset comprising at least the subset of images, information pertaining to the nodes in the context segment graph, and the aggregated user response data;
training one or more machine learning models for predicting image performance based in part on the user responses, wherein training the one or more models comprises training a machine learning algorithm using the generated training dataset to label a relatedness value and a responsiveness value for the plurality of candidate images in context to the node in the context segment graph;
receiving a plurality of candidate images for a creative campaign;
determining, using at least one machine learning model of the one or more machine learning models, a first set of metrics for each candidate image of the plurality of candidate images in context to the node, wherein the first set of metrics for each candidate image includes at least a confidence score and one or more of a relatedness value and a responsiveness value in context to the node;
displaying, in a graphic user interface for a user approval, an advertisement campaign including a listing of the plurality of candidate images comprising the first set of metrics for each of the candidate images;
receiving advertisement performance data for a plurality of advertisements, wherein each advertisement of the plurality of advertisements displays an image from the subset of images;
determining, for each image displayed in an advertisement, an aggregate score, wherein the aggregate score is based at least in part on the relatedness values and responsiveness values for the image received via the user responses;
comparing, for each image displayed in an advertisement, a respective aggregate score and respective advertisement performance data; and
validating the one or more machine learning models for predicting image performance based in part on comparing the respective aggregate scores and advertisement performance data.

* * * * *